(12) United States Patent
Ben-Shachar et al.

(10) Patent No.: US 6,209,018 B1
(45) Date of Patent: Mar. 27, 2001

(54) SERVICE FRAMEWORK FOR A DISTRIBUTED OBJECT NETWORK SYSTEM

(75) Inventors: Ofer Ben-Shachar, Palo Alto; Vijay Anand; Ken Ebbs, both of Mountain View; Yarden Yaacov Malka, Menlo Park; David Latimer Brewster, Santa Clara, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/969,982

(22) Filed: Nov. 13, 1997

(51) Int. Cl.$^7$ .................................................. G06F 13/00
(52) U.S. Cl. .............................................................. 709/105
(58) Field of Search .................................... 709/105, 102; 395/675

(56) References Cited

U.S. PATENT DOCUMENTS

| | | | |
|---|---|---|---|
| 5,864,866 | * | 1/1999 | Henckel et al. ...................... 707/103 |
| 5,872,971 | * | 2/1999 | Knapman et al. .................... 709/101 |
| 5,903,725 | * | 5/1999 | Colyer ................................. 707/103 |

FOREIGN PATENT DOCUMENTS 0 613 083    8/1994   (EP) .

OTHER PUBLICATIONS

Tokmakoff et al.; Service Brokering in Object–Based Systems: Advanced Information Services; Third International Workshop on Community Networking, 1996; pp. 43–48, May 1996.*

Harry M. Sneed; Encapsulating Legacy Software for Use in Client/Server Systems; Proceedings of the Third Working Conf. on Reverse Enginerring, 1996; pp. 104–119, Nov. 1996.*

Takuma Sudo et al.: "Transaction Processing in Distributed Environments" Hitachi Review, vol. 45, No. 2, Apr. 1, 1996, pp. 55–60, XP000622834.

"Reducing the Latency of Distributed Resource Registration" IBM Technical Disclosure Bulletin, vol. 38, No. 5, May 1, 1995, p. 419/420, XP000519630.

HTML Sourcebook, Third Edition, "A Completer Guide to HTML 3.2 and HTML Extensions", by Ian Graham, 1997.

"Internet Agents: Spiders, Wanderers, Brokers, and Bots", by Fah–Chun Cheong, 1996.

* cited by examiner

*Primary Examiner*—Kenneth R. Coulter
(74) *Attorney, Agent, or Firm*—Forrest Gunnison; Gunnison, McKay & Hodgson, L.L.P.

(57) ABSTRACT

An improved method and apparatus for providing a service framework for a distributed object network system are provided. In some embodiments, an apparatus that includes a server, a service for a limited resource residing on the server, and a pool of workers for the service that execute service requests from a client in a distributed object network system is provided. In some embodiments, a method that includes providing client-side service request encapsulation, balancing workloads among clones of service locators, clones of services, and workers in a worker pool of a service, and improving fault tolerance in a distributed object network system is provided.

16 Claims, 20 Drawing Sheets

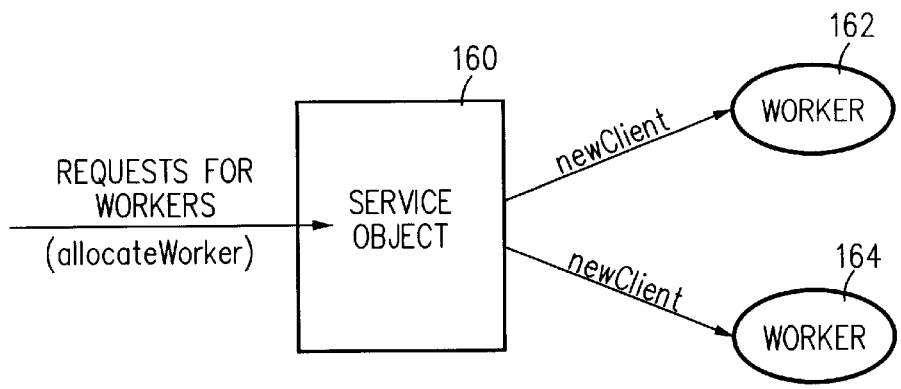
FIG. 7
allocateWorker on
ServiceObject(service, service.properties, reservation.context)
FIG. 8
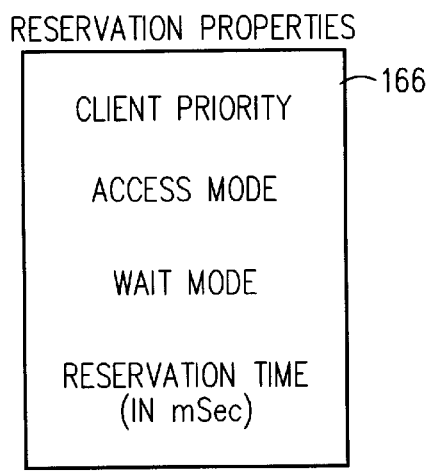
FIG. 9
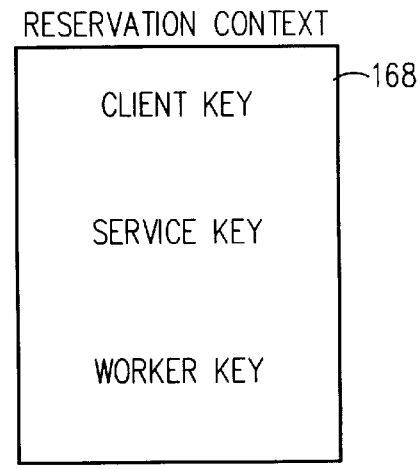
FIG. 10

SERVICE PROPERTIES 180

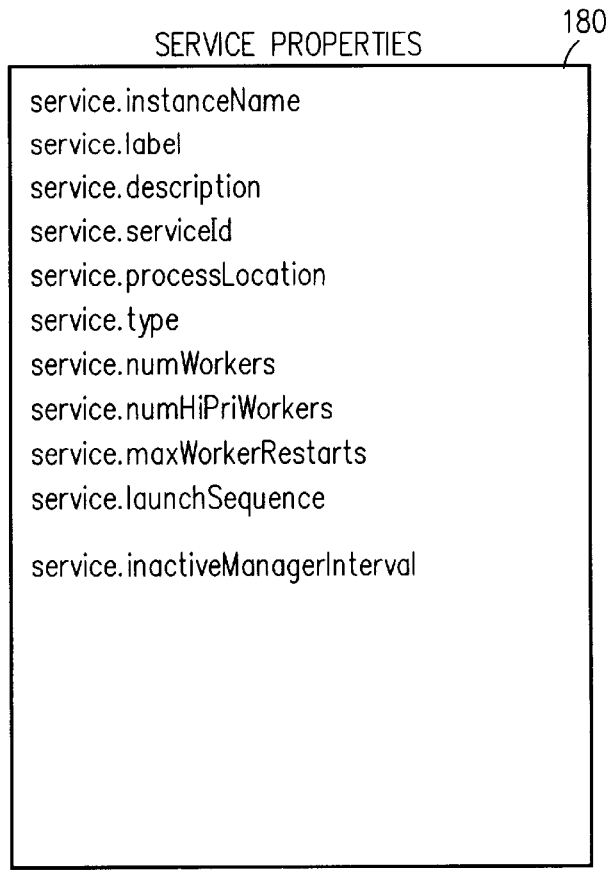

```
service.instanceName
service.label
service.description
service.serviceId
service.processLocation
service.type
service.numWorkers
service.numHiPriWorkers
service.maxWorkerRestarts
service.launchSequence
service.inactiveManagerInterval
```

FIG. 11

```
interface INdService : INdAdmin{ void setReservationProperties(
            in TNdReservationProperties properties,
            inout TNdReservationContext rcontext)
        raises (CNdInvalidStateException, CNdSecurityException);

INdWorker allocateWorker (in TNdReservationProperties properties,
            in INdServiceProxyCallback callback,
            inout TNdReservationContext rcontext)
        raises (CNdNoFreeWorkersException,
            CNdInvalidStateException,
            CNdSecurityException);

void releaseWorker(
            inout TNdReservationContext rcontext)
        raises (CNdUnknownWorkerException,
            CNdInvalidStateException,
            CNdSecurityException);
}
```

FIG. 12

```
interface INdServiceProxyCallback {
        oneway void reservationTimedOut(
        in TNdReservationContext rcontext);
}
```

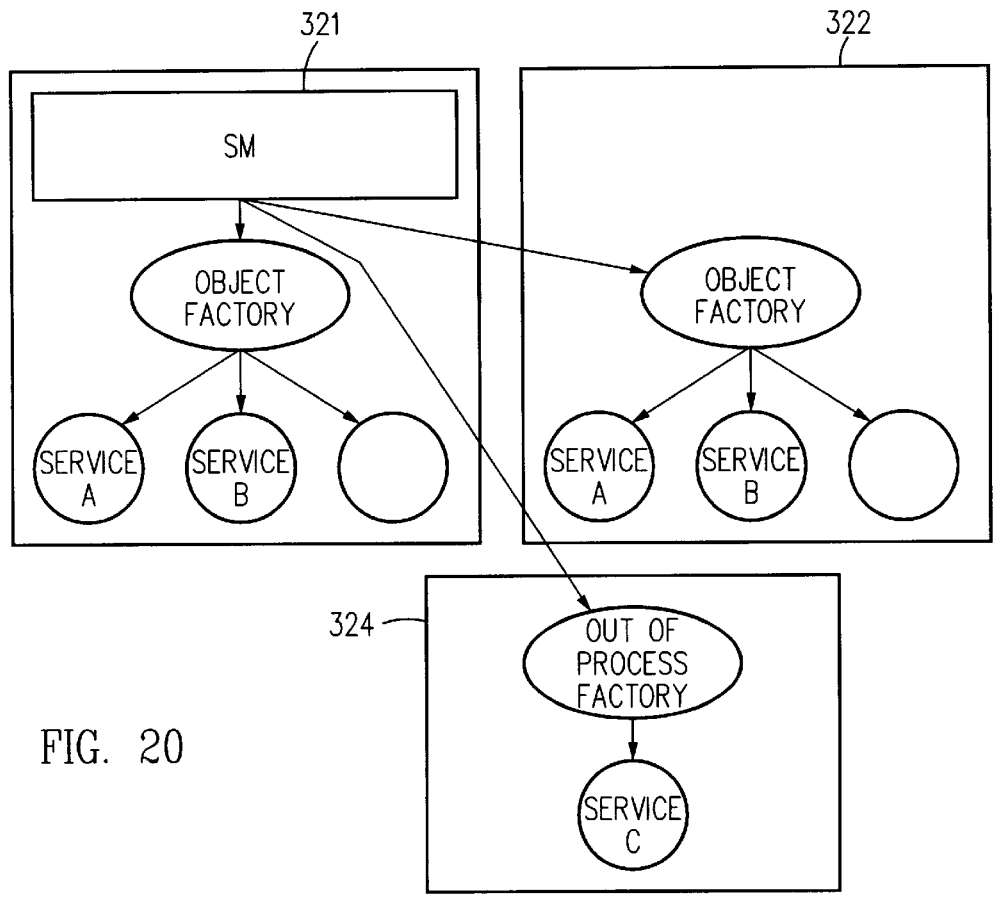

FIG. 20

```
interface INdObjectFactory {
    Object create(
            in string type,
            in TNdAny_seq args,
            in string objectName,
            in boolean makeTie,
            in string tieType,
            in TNdProperty_seq propertyList,
            inout TNdSecurityContext securityContext)
        raises (CNdClassNotFoundException,
        CNdInvalidProperty Exception,
        CNdSecurityException);
    void destroy(
            in Object o,
            inout TNdSecurityContext securityContext)
        raises (CNdObjectNotFoundException, CNdSecurityException);
    void terminate(
            in TNdSecurityContext securityContext)
        raises (CNdSecurityException);
}
```

FIG. 21

SERVICE LOCATOR PROPERTIES

| |
|---|
| sl.javaVM |
| sl.javaDebugVM |
| sl.inactiveManagerInterval |
| sl.locatorId |
| sl.owningManagerId |

```
interface INdLocator : INdAdmin {
    TNdServiceData getService(
            in string instanceName,
            inout TNdSecurityContext securityContext)
        raises (CNdNoServiceException, CNdInvalidStateException,
            CNdSecurityException);

TNdServiceData_seq findService(
            in TNdPropertyListKey serviceProperties,
            inout TNdSecurityContext securityContext)
        raises (CNdNoServiceException, CNdInvalidStateException,
            CNdSecurityException);

void registerServices(
            in TNdServiceManagerData serviceManager,
            in TNdServiceData_seq services,
            inout TNdSecurityContext securityContext)
        raises (CNdInvalidStateException, CNdSecurityException);

void updateServicesLoad(
            in TNdServiceManagerData serviceManager,
            in TNdServiceLoad_seq services,
            inout TNdSecurityContext securityContext)
        raises (CNdServiceMismatchException,
            CNdInvalidStateException,
            CNdSecurityException);

TNdServiceManagerData_seq getServiceManagers(
            inout TNdSecurityContext securityContext)
        raises (CNdInvalidStateException, CNdSecurityException);
    string_seq getServiceLocatorNames(
            inout TNdSecurityContext securityContext)
        raises (CNdInvalidStateException, CNdSecurityException);
}
```

FIG. 23

```
public interface ICNdLoadBalancing
{
        ////////// Worker registration //////////
        public void registerWorker (INdWorker w,
                CNdWorkerAttributes attributes);

public void unregisterWorker (INdWorker w,
                netdyn.cosi.stubs.TNdSecurityContextHolder securityContext)
                throws CNdUnkownWorkerException;

////////// Worker reservation //////////
        public INdWorker allocateWorker(
                INdServiceProxyCallback revocationCallback,
                TNdReservationProperties properties,
                TNdReservationContext rcontext)
                throws CNdNoFreeWorkersException;

public void releaseWorker(
                TNdReservationContext rcontext)
                throws CNdUnkownWorkerException;

public void setReservationProperties(
                TNdReservationProperties properties,
                TNdReservationContext rcontext);

////////// update worker statistics //////////
        public void update WorkerLoad(
                INdWorker w,
                TNdLoad load)
                throws CNdUnkownWorkerException;

public INdWorker[] getWorkers();

////////// Load manager control //////////
        public void stop(
                netdyn.cosi.stubs.TNdSecurityContextHolder securityContext)
                throws CNdInvalidStateException,
                        CNdSecurityException;

public void start(
                netdyn.cosi.stubs.TNdSecurityContextHolder securityContext)
                throws CNdInvalidStateException,
                        CNdSecurityException;

public void terminate(
                netdyn.cosi.stubs.TNdSecurityContextHolder securityContext)
                throws CNdSecurity Exception;

```
interface INdAdmin {
    readonly attribute string INSTANCE_NAME;
    void getLoad(
            out TNdLoad load,
            inout TNdSecurityContext securityContext)
            raises (CNdInvalidStateException, CNdSecurityException);

void getStatistics(
            in string_seq whichStatistics,
            out TNdStatistic_seq statistics,
            inout TNdSecurityContext securityContext)
            raises (CNdInvalidStateException, CNdSecurityException);

void dumpState(
            in long stateMask,
            inout TNdSecurityContext securityContext)
            raises (CNdSecurityException);

void terminate(
            in TNdSecurityContext securityContext)
            raises (CNdInvalidStateException, CNdSecurityException);

void stop(
            inout TNdSecurityContext securityContext)
            raises (CNdInvalidStateException, CNdSecurityException);

void start(
            inout TNdSecurityContext securityContext)
            raises (CNdInvalidStateException, CNdSecurityException);

void restart(
            inout TNdSecurityContext securityContext)
            raises (CNdInvalidStateException, CNdSecurityException);

readonly attribute TNdObjectState CURRENT_STATE;

TNdSetPropertyResult set Properties(
            in TNdProperty_seq propertyList,
            inout TNdSecurityContext securityContext)
            raises (CNdInvalidProperty Exception,
    CNdInvalidStateException, CNdSecurityException);

void message(
            in string messageName,
            in string_seq messageParameters,
            inout TNdSecurityContext securityContext)
            raises (CNdInvalidStateException, CNdSecurityException);
    //attributes of any COSI or derived interface
    readonly attribute TNdVersion VERSION;
    readonly attribute TNdVersion COSI_VERSION;
}
```

FIG. 32

SERVICE FRAMEWORK FOR A DISTRIBUTED OBJECT NETWORK SYSTEM

FIELD OF THE INVENTION

This invention relates to programmed computers and, more particularly, to an improved method and apparatus for providing a service framework for a distributed object network system.

BACKGROUND

Computer systems that provide users access to limited resources are well known. For example, a client-server system represents a common paradigm for providing shared access to a limited resource such as a computer database on a server. The typical client-server system includes a computer (the "server") in which one or more limited resources reside (e.g., are stored) and one or more satellite computers (the "clients") which access the limited resources. The access is generally performed over an electronic communication system. The clients access the limited resources on an as needed basis.

A server typically includes a computer or multiple computers connected via an electronic communication system, services (e.g., a data service that provides access to a database residing in a computer or a distributed service residing in multiple computers connected via an electronic communication system), and a storage for storing the services. The storage typically includes some combination of random access memory ("RAM") and magnetic media, such as tapes and disks or optical media, and other storage devices. Depending on the requirements of the system, the server may be a personal desktop computer that includes a hard-disk, a large mainframe computer that includes multiple tape drives, or some other kind of computer.

A client may be a personal computer, a workstation, or some other kind of computer. A client may be either remote from the server (i.e., the client accesses the server via an electronic communication system) or local to the server (e.g., the client accesses the server via a local bus). A client may include one or more "applications" such as a word processor, a web browser, or database interface software to access information from a database on a server. Some of the applications may be under the control of a human operator and others may run automatically or under the control of another application.

An electronic communication system ("network") may include commercial telephone lines as well as dedicated communication lines to carry data signals between the server and the client.

Prior client-server approaches allow a limited number of clients to access limited resources residing in a server. In particular, in the typical client-server environment, the workload characteristics are predictable and well known because of the predetermined limit on the number of clients and the well known nature of the clients.

However, increasing Internet usage presents a unique problem for providing a dramatically increasing and unpredictable number of clients efficient and fair allocation of access to limited resources residing in a server. Accordingly, prior client-server approaches are inadequate for the Internet environment, because the number of concurrent users in the Internet environment generally exceeds the number of concurrent users in a typical client-server environment and is generally more unpredictable.

A Common Object Request Broker Architecture (CORBA) represents a partial attempt to address the problem of providing an increasing and unpredictable number of users access to limited resources residing in a server. CORBA provides a client/server middleware defined by an industry consortium called the Object Management Group (OMG), which includes over 700 companies representing the entire spectrum of the computer industry.

In particular, CORBA defines an implementation-independent component-based middleware. CORBA allows intelligent components to discover each other and interoperate on an object bus called an Object Request Bus (ORB). CORBA objects can reside anywhere on a network. Remote clients can access a CORBA object via method invocations. Clients do not need to know where a CORBA object resides or on which operating system the CORBA object is executed. Thus, a client can access a CORBA object that resides in the same process or on a machine in another country connected via the Internet.

Further, both the language and compiler used to create CORBA objects are transparent to clients. For example, a CORBA object may be implemented as a set of C++ classes, in JAVA bytecode, or in COBOL code. Thus, the implementation of the CORBA object is irrelevant to the client. The client only needs to know the interface of the CORBA object. CORBA uses an Interface Definition Language (IDL) to define a CORBA object's interface, and the IDL also allows for specifying a component's attributes such as the parent classes it inherits from and the methods its interface supports. For example, a CORBA object provides an implementation for the CORBA object's IDL interface using a language for which an IDL mapping exists. In particular, CORBA defines a standard mapping from the IDL to other implementation languages such as C++, JAVA, ADA, etc.

A CORBA IDL compiler generates client-side stubs and server-side skeletons for the CORBA object's IDL interface.

CORBA also specifies bus-related services for creating and deleting objects, accessing them by name, storing them in persistent stores, externalizing their states, and defining ad hoc relationships between them. Accordingly, CORBA provides a flexible distributed-object middleware that provides client-server interoperability. CORBA and JAVA are both further described in "Client/Server Programming with JAVA™ and CORBA" by Robert Orfali and Dan Harkey (John Wiley & Sons: New York, N.Y., 1997).

FIG. 1 shows a typical CORBA environment 38. A client 40 connects to a server 54 via a network 44 (e.g., via the Internet). A client 42 connects to the server 54 via a network 46 (e.g., via the Internet). A client 50 connects to the server 54 via a network 48 (e.g., via the Internet). CORBA provides local/remote transparency in a distributed object network as shown in FIG. 1 by providing Internet Inter-ORB Protocol (IIOP) services 52. An ORB service represents a standard CORBA service that can broker inter-object calls within a single process, multiple processes running within the same machine, or multiple processes running within different machines that may be across multiple networks and operating systems. For example, the client 42 includes an application that uses client-side stubs to obtain an object reference (e.g., a handle) to a remote CORBA object and to dispatch method invocations to the remote CORBA object. The communication between the client and the server-side object uses the IIOP.

Referring to FIG. 1, the server 54 includes a relational database management systems (RDBMS) 60 (e.g., residing in a storage of the server 54). The server 54 also includes a data service 56, which can be implemented as a collection of CORBA objects, that encapsulates the limited resource, the RDBMS 60. For example, the data service 56 may provide a set of operations that can execute SQL queries, stored procedures, and perform connection management.

Referring to FIG. 1, the data service 56 can be used by standard applications (e.g., a database interface) that reside in the clients 40, 42, and 50. The clients 40, 42, and 50 obtain a handle (e.g., an object reference) to bind to the data service 56. In particular, CORBA's object location mechanism includes the CORBA client stubs which offer a bind mechanism to locate a remote object and obtain an object reference for the remote object. Accordingly, the server 54 provides various services such as the data service 56. The server 54 also includes standard CORBA support services in a CORBA layer 58 for activating the data service 56 and administering the data service 56.

However, the standard CORBA support services do not provide significant client-side encapsulation for requesting a service, efficient workload balancing, a substantial variety of access modes, or robust fault tolerance. Accordingly, an improved method and apparatus for providing a service framework for a distributed object network system is needed.

BRIEF DESCRIPTION

The present invention provides an improved method and apparatus for providing a service framework for a distributed object network system. Accordingly, in some embodiments, the service framework includes a service proxy that encapsulates the operation of requesting a service from a server.

In some embodiments, the service framework also includes a load balancing manager for balancing workloads among workers in a worker pool of a service. Also, the service framework may include a service locator for balancing workloads among clones of a service. Further, the service framework may include a service locator proxy for balancing workloads among clones of service locators that provide handles (e.g., object references) to a service.

In some embodiments, the present invention is used to deploy scalable applications (e.g., enterprise applications) over the World Wide Web (WWW).

In some embodiments, a method is disclosed for providing client-side service request encapsulation. The method may also include balancing workloads among clones of service locators, clones of services, and workers in a worker pool. The method may also include improving fault tolerance in a distributed object network system.

Other aspects and advantages of the present invention will become apparent from the following detailed description and accompanying drawings.

BRIEF DESCRIPTION OF THE DRAWINGS

FIG. 7 shows a service object of the server of FIG. 3 in accordance with another embodiment of the present invention.

FIG. 8 provides a call to allocateWorker on a service object in accordance with some embodiments of the present invention.

FIG. 9 provides reservation properties in accordance with some embodiments of the present invention.

FIG. 10 provides a reservation context in accordance with some embodiments of the present invention.

FIG. 11 provides service properties in accordance with some embodiments of the present invention.

FIG. 12 provides a reservation interface of the service object of FIG. 3 in accordance with some embodiments of the present invention.

FIG. 20 shows clone factories in accordance with some embodiments of the present invention.

FIG. 21 provides an object factory interface in accordance with some embodiments of the present invention.

FIG. 22 provides service locator properties in accordance with some embodiments of the present invention.

FIG. 23 provides a service locator interface in accordance with some embodiments of the present invention.

FIG. 24 provides a load balancing manager (LBM) interface in accordance with some embodiments of the present invention.

FIG. 32 provides an interface of the administrative interface in accordance with some embodiments of the present invention.

DETAILED DESCRIPTION OF THE PREFERRED EMBODIMENTS

The present invention provides an improved method and apparatus for providing a service framework for a distributed object network system. In particular, a client-server system in which a significant number of clients access distributed objects on a server (e.g., a distributed enterprise application deployed over the global Internet) would significantly benefit from this improved method and apparatus.

For example, an application (e.g., a web browser) that runs on a client may allow the client to access a data service (e.g., a service for a database such as an RDBMS) that runs on a server. The data service often must be made accessible to a significant and unpredictable number of clients. Moreover, a significant number of clients may attempt to simultaneously access the data service, but some users may have higher priority than other users. Accordingly, a service framework should provide significant client-side encapsulation for requesting a service, ensure efficient workload balancing, offer a variety of access modes, provide significant scalability, and maintain robust fault tolerance.

Figure 1:
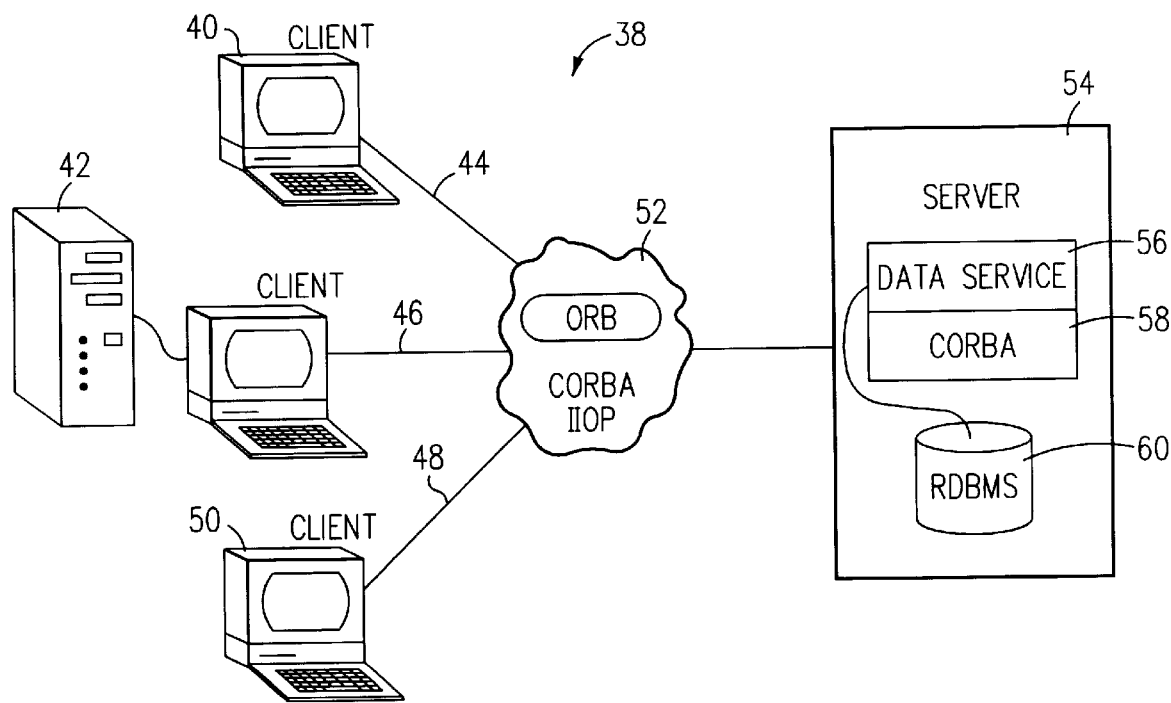
FIG. 1 shows a typical CORBA environment.
Figure 2:
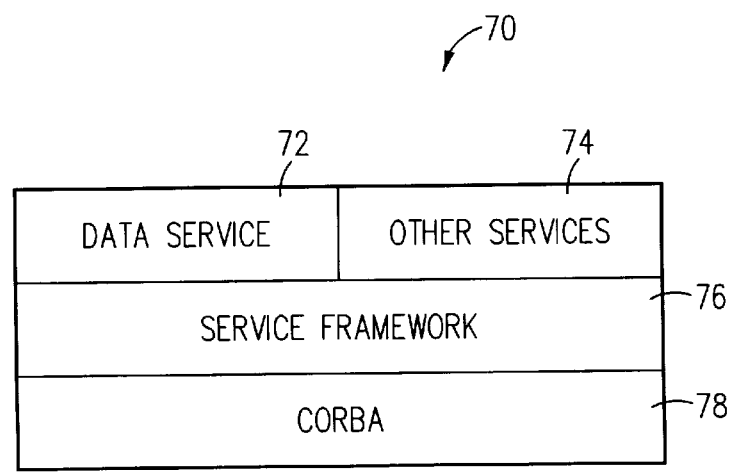
FIG. 2 shows a framework model that includes a service framework in accordance with some embodiments of the present invention.

FIG. 2 shows a framework model 70 that includes a service framework 76 in accordance with some embodiments of the present invention. In particular, the service framework 76 is implemented on top of a Common Object Request Broker Architecture (CORBA) bus 78. The service framework 76 provides a platform of services which extend the CORBA support services in the CORBA bus 78. In some embodiments, the service framework 76 includes services that support and encapsulate enterprise resources (i.e., a service represents an encapsulation of a resource) such as a data service 72 or other services 74 (e.g., an Email service, a document management service, etc.). For example, the data service 72 includes a service CORBA object and a pool of worker CORBA objects. In some embodiments, an object represents a set of computer instructions that can be executed by a computer.

In some embodiments, the service framework 76 provides improved access to services, manages the life cycle of services, and provides administrative capabilities to manage a group of services. In some embodiments, the service framework 76 is implemented as a collection of objects written in JAVA and C++, and the architecture of the service framework 76 is the definition of the collection of objects and the interaction among objects in the collection. In some embodiments, the service framework 76 supports services implemented using C++, JAVA, etc. Accordingly, the service framework 76 provides a variety of methods to access services, and the service framework 76 also provides an architecture that is scalable, modular, fault tolerant, and easily extendible (i.e., new services are easy to plug in).

Generally, in order to access a service, a client must obtain a handle (e.g., an object reference) to a particular service object for the service on which the client intends to execute an operation (a service request). In some embodiments, the service framework includes an object (e.g., a CORBA object) called a service locator that maintains the name space of service instances. For example, the service locator repository may contain an entry for an RDBMS service instance with the name "RDBMS service", a handle to the RDBMS service's service object, and a set of properties for the service (e.g., database types supported). The service locator exports a service lookup interface that provides a findService operation. The findService operation takes a service name and, or a set of properties for a service, and the findService operation returns a set of service object handles that match the name and, or the set of properties.

Figure 3:
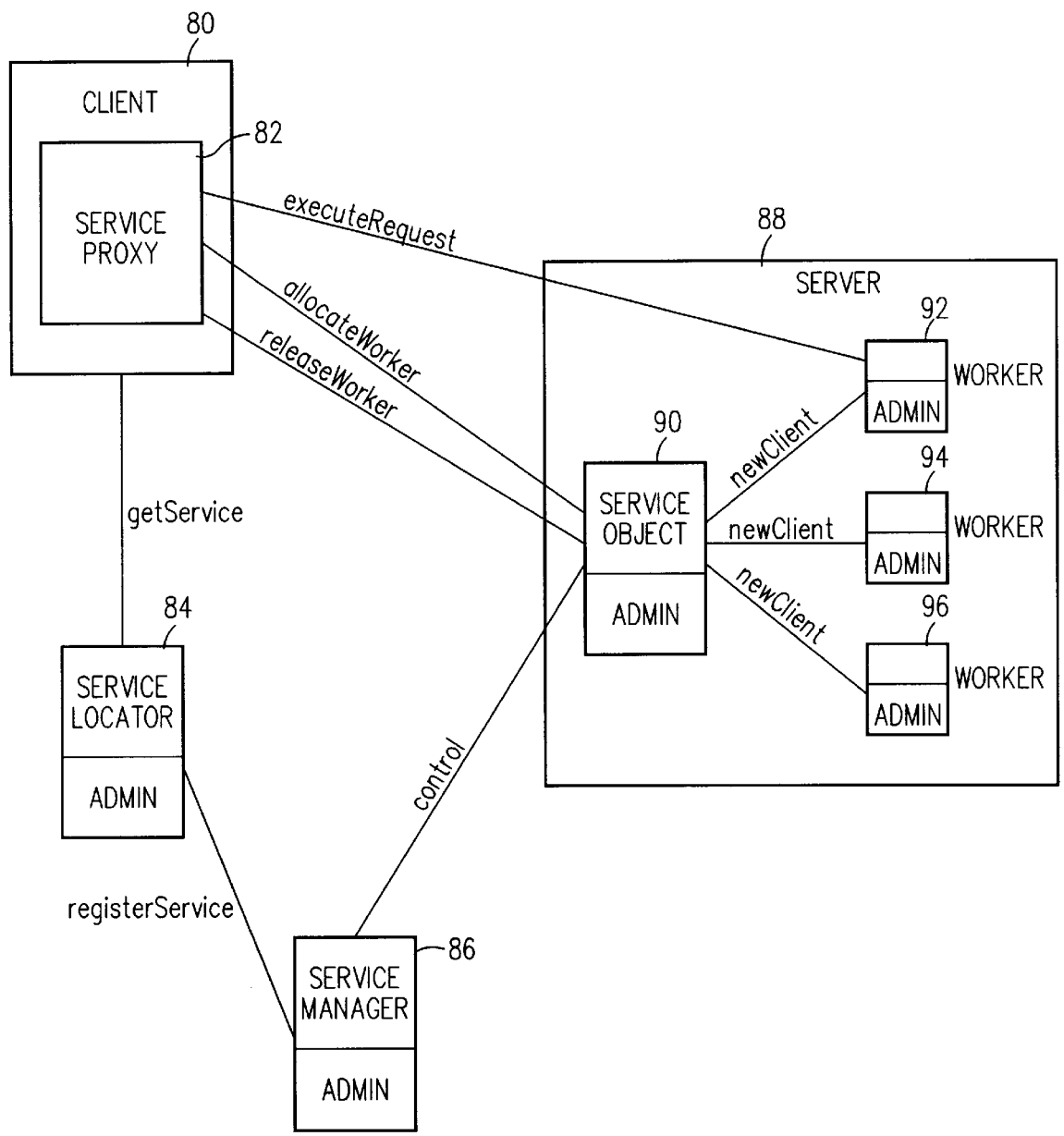
FIG. 3 shows a service framework for a distributed object network system in accordance with some embodiments of the present invention.

FIG. 3 shows a service framework for a distributed object network system in accordance with some embodiments of the present invention. A client 80 includes a service proxy 82 residing in client storage. A service locator 84 includes a registry of services. Thus, the service locator 84 provides the location (e.g., an object reference) of a particular service in the distributed object network system in which there may be a large number of services at any one time.

Each service residing in a server 88 is managed by a service manager (SM) 86. The SM 86 performs several tasks. For example, the SM 86 starts a service and starts a service locator. The SM 86 then registers the services under its control with all known service locators in the distributed object network system. In another embodiment, there may be more than one service locator as discussed further below with respect to FIG. 20, but each service locator contains the same set of services accessible over the entire distributed object network system. Also, services can be grouped logically, as discussed further below with respect to FIG. 18.

Referring to FIG. 3, the service locator 84 exports a registerService method that is used by the SM 86 to register its services with the service locator 84. The registerService call simply registers a collection of services managed by a SM such as the SM 86 and the properties of each service. However, not all properties of a service may be registered by the SM 86. In some embodiments, only those properties that would have an impact on the clients are registered by the SM 86. The SM 86 also periodically updates the repository of all the services registered with the service locator 84 along with any changes in the set of services that it manages.

In some embodiments, if the SM 86 does not ping the service locator 84 in a predetermined period of time, the service locator 84 assumes that the SM 86 and all its contained services have died and quietly removes the set of services from its repository. Also, if the parent of the service locator 84 (the service manager that launched the service locator, for example, the SM 86) does not ping in time, the service locator 84 assumes that the parent exited due to an error and terminates itself. These operations are part of the fault tolerance capabilities of the service framework of the present invention.

In some embodiments, the SM 86 essentially represents an administrative object and does not perform a direct role in executing requests for services. For example, the SM 86 manages the life cycle and other administrative issues of the services. The SM 86 may also collect the statistics of the services and pass the statistics to the service locator 84 for workload balancing purposes. These operations may be performed automatically by the SM 86. Further, the SM 86 may be responsible for instantiating the service locator 84 and all of the services residing in the server 88. The SM 86 exports an administrative interface (as discussed further below with respect to FIG. 32) that allows the definition of new services, bringing services up and down, and modifying the properties of the services (e.g., the number of workers in the worker pool of a service). In addition for each service, the SM 86 may instantiate a service object such as the service object 90.

In some embodiments, the service object 90 is responsible for instantiating a worker pool which may include workers 92, 94, and 96 (e.g., the workers 92, 94, and 96 may include different worker properties as discussed further below with respect to FIG. 16). The service object 90 may also be responsible for reserving a worker as discussed further below. The workers 92, 94, and 96 support the operations of the service (e.g., a DataService includes operations that provide access to a database). The workers 92, 94, and 96 may be distributed among different address spaces, which provides fault tolerance in the event of an abnormal failure of a particular address space. As shown in FIG. 3, the service object 90 manages the workers 92, 94, and 96 and, in some embodiments, provides a reservation mechanism for clients. The reservation mechanism is discussed in further detail below.

In some embodiments, the service proxy 82 supports the methods exported by the IDL interfaces of the workers 92, 94, and 96. For example, a worker method that is encapsulated in the service proxy 82 uses an object reference to the worker 92 to dispatch the worker method to the remote worker 92 and obtain results from the worker method. The communication between the service proxy 82 and the worker 92 is performed using the IIOP.

The service framework as shown in FIG. 3 represents a collection of objects (e.g., the service proxy 82, the service locator 84, the SM 86, the service object 90, the workers 92, 94, and 96, etc.) The architecture of the service framework is the definition of the objects and the interaction mechanism between the objects.

In some embodiments, the service locator 84, the SM 86, the service object 90, and the workers 92, 94, and 96, all represent CORBA objects. Each of these objects exports a CORBA interface in the form of an IDL (Interface Definition Language) interface. The client 80 includes the service proxy 82 that can bind to the service locator 84 by name (e.g., using CORBA's object location mechanism). Other objects such as the service object 90 and the workers 92, 94, and 96 represent transient objects. The service proxy 82 can get a handle (e.g., an object reference) to transient objects such as the service object 90 through the getService operation of the service locator 84. The communication between the service proxy 82 and the service object 90 may be a direct CORBA invocation over IIOP.

In some embodiments, most of the service framework is implemented in JAVA. In particular, the SM 86, the service object 90, and the service locator 84 are all implemented in JAVA, but the service proxy 82 and the workers 92, 94, and 96 are implemented in both JAVA and C++. For example, C++ clients can use a C++ service proxy to bind to the service locator 84, obtain a CORBA object reference to a service object, and reserve a worker by obtaining an object reference to a worker. Also, services can be built using C++. For example, an RDBMS service can be implemented in C++ and use native client libraries to access the database. The service proxy 82 as shown in FIG. 3 encapsulates various operations such as executeRequest, allocateWorker, and getService, and these operations are further discussed below with respect to FIG. 4.

In some embodiments, the server 88 may include, for example, a Solaris™ operating system, an HP-UX™ operating system, or a Windows NT™ operating system. In some embodiments, the server 88 includes a data service which provides a relational database system, a standard type of commercial data management technology.

In some embodiments, the service object 90 is a service object for a data service. A service is a logical term that represents an encapsulation of a resource. For example, if the resource is a relational database management system (RDBMS), then an RDBMS service encapsulates the RDBMS by providing, for example, a set of operations that can execute SQL queries, stored procedures, and perform connection management. Client applications that require access to the RDBMS can use the RDBMS service. In some embodiments, the RDBMS service is implemented as a collection of objects that collectively perform the functions of the RDBMS service.

In particular, the service object 90 provides the workers 92, 94, and 96 that encapsulate a resource on the server 88. Using an RDBMS service as an example, the workers 92, 94, and 96 each export an interface of operations that includes executing an SQL statement or a stored procedure. The workers 92, 94, and 96 also manage the connections to the RDBMS resource. In some embodiments, the workers 92, 94, and 96 encapsulate any connection state, cache execution results, and perform cursor-based lookups (e.g., maintain state on behalf of the connection). Further, in some embodiments, the workers 92, 94, and 96 are implemented as a class in C++ or JAVA that derives directly from a class of the service framework that provides all the capabilities of the service framework (e.g., workload balancing, fault tolerance, etc.). Thus, the workers 92, 94, and 96 may use the object-oriented inheritance mechanism to inherit all the capabilities of the service framework, and the workers 92, 94, and 96 may provide an interface (e.g., an IDL interface) for export. Each worker is independent of the other workers (i.e., each worker is unaware of the other workers). Hence, the implementation of the worker needs to consider the resource logic only, not the service framework itself.

The service object 90 (in some embodiments, there is only one service object per service) is responsible for handing out a handle of a worker in a worker pool (i.e., a worker handle) to clients that are, using the RDBMS example, interested in executing an SQL statement or stored procedure (i.e., interested in performing an RDBMS transaction). In some embodiments, the service object 90, in deciding which worker from the pool to allocate, performs workload balancing among the workers and may also offer a variety of access modes from clients (e.g., transactional access, exclusive access, shared access, priority based access, etc.) as discussed further below. The service object 90 exports a worker reservation interface that includes allocateWorker and releaseWorker operations (e.g., methods) to allocate a worker and release a previously allocated worker, respectively, as discussed further below with respect to FIG. 12.

In the RDBMS example, the service locator 84, which maintains the name space of service instances (i.e., the set of services registered in the service locator of the cell, and in some embodiments, every service in the cell is registered with the service locator, and services in a different cell are not registered with the service locator), a repository of service objects, service names, and a set of properties associated with each service (service properties are discussed further below with respect to FIG. 11), has a local repository that contains an entry for the RDBMS service with the name "RDBMS service", a handle to the service object 90 for the RDBMS service, and a set of properties for the RDBMS service. The service locator 84 exports a service lookup interface that contains a findService operation. The findservice operation takes a service name and, or a set of properties for a service and returns a set of service object handles that match the name and, or properties. Thus, the client 80, if it is interested in obtaining a handle to a particular service in which it intends to execute an operation, executes a findService operation on the service locator 84 with the name of the service it is interested in (in this example, "RDBMS service"). In some embodiments, the service locator 84 also provides a level of workload balancing in the service framework, which is discussed further below. In addition, the service locator 84 periodically updates and loads existing services.

Accordingly, FIG. 3 illustrates the service framework that provides significant extensions to CORBA-based distributed object network system in accordance with some embodiments of the present invention. Those skilled in the art will recognize that the service framework can also be provided in a system with multiple servers with multiple (distributed) services and (distributed) clones of services.

In some embodiments, a WWW (world wide web) or web application is provided using the service framework of the present invention. In particular, the client 80 includes a client application such as a web browser (e.g., Netscape Navigator) that is capable of rendering HTML (hyper-text markup language) or hosting JAVA applets or ActiveX controls. A web server (not shown) that supports HTTP requests from the web browser and launches a thin CGI/ISAPI/NSAPI to deliver HTTP requests to the application server (e.g., the server 88) is provided.

For example, a web browser in the client 80 dispatches an HTTP request to the web server which launches a CGI, NSAPI, or ISAPI plug-in that is a client to the application server (e.g., the server 88). In particular, the plug-in represents a CORBA client that issues a call to the service locator 84 to locate an appropriate service (e.g., a web service). Thus, the application server may be completely isolated from the web server. The plug-in then dispatches the web event to the web service. The application server may provide a service implemented using CORBA objects that are activated (i.e., instantiated) prior to the incoming call for the service provided by the application server. The web service executes the application logic, interacts with one or more data services in the application server, and stores session and state information. The web service returns the result of the web event which is an HTML page back to the web browser in the client 80. Alternatively, the web browser can host a JAVA applet or an ActiveX control that connects directly to the application server using the IIOP. Thus, the JAVA applet bypasses the web server and interacts directly with the application server using the IIOP, which may provide improved performance.

Accordingly, the service framework of the present invention provides a distributed, fault tolerant, scalable, and object-oriented architecture that supports a variety of services that can be accessed over the web (e.g., enterprise web applications). Further, the service framework of the present invention provides a reservation mechanism (as discussed below) that supports web applications that can efficiently and fairly manage a collection of resources that are accessed by clients across the Internet. Also, the dynamic scalability and fault tolerance of the present invention is particularly advantageous for enterprise applications that can afford little or no downtime.

Figure 4:
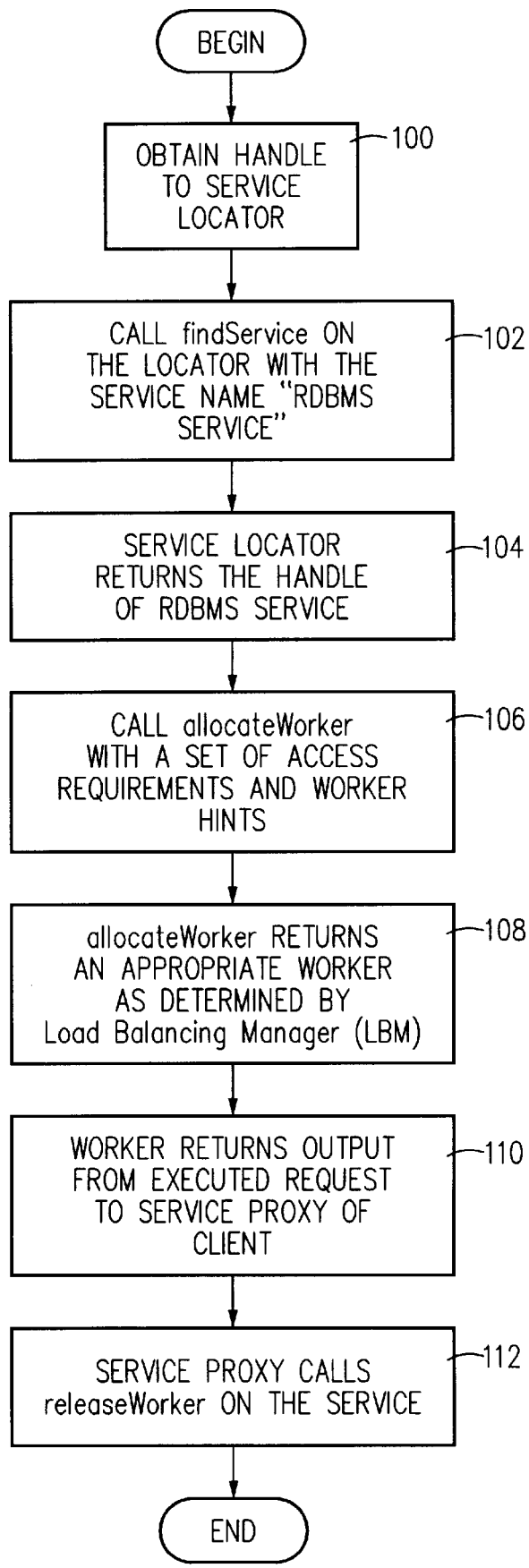
FIG. 4 is a flow diagram illustrating the operation of a service proxy in accordance with some embodiments of the present invention.

FIG. 4 is a flow diagram illustrating the operation of a service proxy in accordance with some embodiments of the present invention. In particular, FIG. 4 shows the stages of operation that must be performed by a client that wishes to execute, in the RDBMS example, an SQL request. In such an embodiment, rather than having the client perform each of the steps necessary to get a worker object, a service proxy object is provided, and the service proxy object performs the necessary steps to encapsulate the process of obtaining a worker for a particular service. Thus, from the client's perspective, the client simply requests execution of an operation on a service, and the process of obtaining a worker is transparent to the client, because the service proxy performs the necessary steps to obtain the worker. This approach is advantageous, because this approach encapsulates the framework internals so that clients are not required to know anything about the framework internals, and clients do not have to perform the task of handling any errors encountered when executing the steps for obtaining a worker. Moreover, this approach advantageously allows the framework to support fault tolerant features such as automatically retrying the request if the original request fails (e.g., error handling).

In some embodiments, the service proxy is an object that resides in the client and encapsulates a particular service in its entirety. In some embodiments, the service proxy intercepts every call from the client to the worker, and the service proxy includes the same set of methods as the worker. For example, a client applet (e.g., a JAVA applet such as CNdDataServiceProxy dsProxy=new netdyn.services.ds.client.CNdDataServiceProxy()) invokes an operation on the worker by executing the equivalent method on the service proxy (e.g., an execute SQL call). The service proxy then reserves a worker (e.g., if a worker is not already reserved, then allocateWorker is called on the service to obtain a worker object reference) and dispatches the method (e.g., the execute SQL call) to the worker using a CORBA/IIOP call. The service proxy obtains the result of the method from the worker and then passes the result back to the client. Thus, the service proxy is aware of every method invocation on a worker.

In some embodiments, each service in the service framework has a corresponding service proxy. Thus, a service proxy encapsulates a service, because from the client's perspective the service proxy implements all the operations of the service itself. For example, the service proxy is responsible for insuring that a worker handle has been obtained before invoking the operation on the worker. As a result, the task of locating the appropriate service and obtaining a worker is encapsulated within the service proxy. For example, there may be a single instance of the data service for an RDBMS, but there may be many clients requesting access to the data service. Each client instantiates a service proxy and invokes the "execute SQL" operation on the service proxy. All the instantiated service proxies (in each client) simply invoke the corresponding "execute SQL" operation on the service itself. Hence, from the client's perspective, the client can instantiate a service and execute an operation on the service. However, the service proxy actually obtains a handle to a worker and forwards all requests to the allocated worker.

In particular, FIG. 4 illustrates the stages of operation performed by the service proxy in accordance with some embodiments of the present invention. Reference numeral 100 refers to a first stage in this embodiment. In stage 100, the service proxy obtains a handle to the service locator. For example, the service locator object is registered with the ORB by providing a unique object name (e.g., using the obj__is__ready call). After the service locator object has been registered with the ORB, the client can use the ORB-provided bind call and supply the name of the service locator object to obtain an object reference to the service locator.

In some embodiments, the service framework provides a first level of workload balancing. In the first level of workload balancing, as discussed further below, the find-Service operation returns the handle of a particular service locator instance selected among multiple instances of the service locator (e.g., service locator clones). In stage 102, the service proxy calls findService on the service locator with a service name "RDBMS service", in the RDBMS example.

Referring to FIG. 4, in stage 104, the service locator returns the handle of an available RDBMS service (e.g., an RDBMS service that is currently up and running). In some embodiments, the service framework provides a second level of workload balancing. In the second level of workload balancing, as discussed further below, the service locator periodically requests and loads statistics from all the services (e.g., across machines in a distributed configuration) and then can provide the handle of the least busy instance of the requested service based on the statistics. Also, at this point, security checks may be performed to insure that the client ID, as discussed further below, is valid for the requested service access (e.g., license restrictions).

In stage 106, the service proxy calls allocateWorker on the service object with a set of access requirements and worker hints, as discussed further below with respect to FIG. 9. In some embodiments, a third level of workload balancing is provided. In particular, as discussed further below, when a call to allocateWorker on the service object is presented, reservations are requested based on some level of access or some class of access specified by the service proxy. The requested worker access must be valid relative to the client ID of the client of the requesting service proxy. For example, a specific duration of reservation may be requested, exclusive access may be requested, or access that chooses to wait or not to wait may be requested as discussed further below with respect to FIG. 9. Thus, in the third level of workload balancing, a client that is itself a high priority client that is permitted access for high priority work and thus can request a high priority worker. The reservation mechanism is implemented in the service object and is discussed further below.

In stage 108, the allocateWorker operation returns an appropriate worker as determined by the service object's load balancing manager (LBM) based on runtime workload statistics of each worker as discussed further below with respect to FIG. 25. In stage 110, the service proxy uses the worker handle to execute the SQL request on the worker, and the worker returns the output from the execution to the service proxy of the client. In stage 112, the service proxy calls releaseWorker on the service object to release the reservation on the worker.

Accordingly, FIG. 4 illustrates the advantages of providing a service proxy that encapsulates the process of requesting a service. For example, the service proxy implements fault tolerance. In particular, if a client requests a service (e.g., in a wait mode as described further below with respect to FIG. 9) and there are no available workers for the service, the service proxy can request access to a worker for the service and the request is queued (e.g., in a first in, first out (FIFO) queue). Further, the service proxy can implement a fairly sophisticated system of retrying. For example, if the service proxy requested a worker for a service and the worker was not available, the service proxy can retry by re-requesting the service from the service locator. Moreover, the fault tolerance mechanisms performed by the service proxy are completely transparent to the client.

Figure 5:
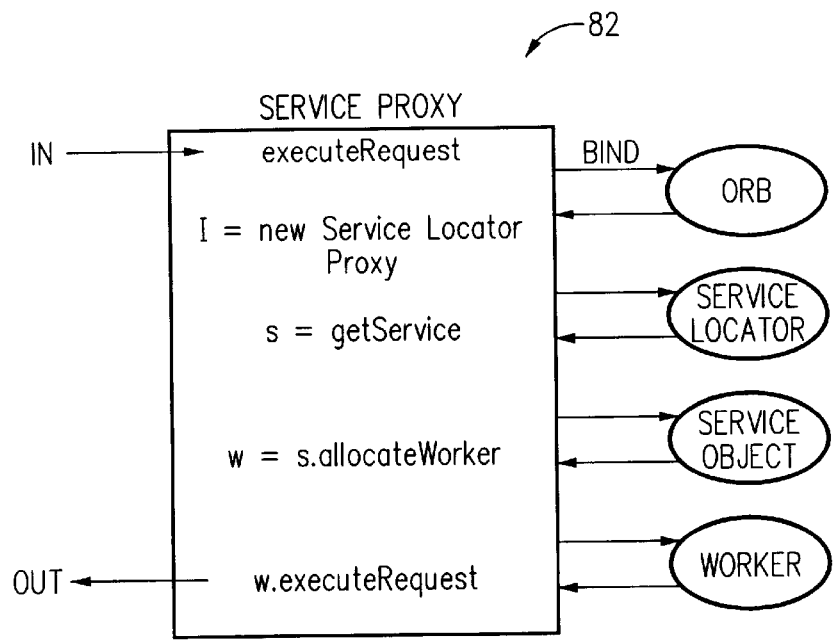
FIG. 5 shows the service proxy of the client of FIG. 3 in greater detail in accordance with some embodiments of the present invention.

FIG. 5 shows the service proxy 82 of the client 80 of FIG. 3 in greater detail in accordance with some embodiments of the present invention. The service proxy 82 encapsulates the complex logic involved in requesting a service.

In some embodiments, each service has a service proxy that has the same set of operations as the service itself (i.e., the service proxy interface is identical to the interface of the service's workers). The client uses the service proxy by simply instantiating the service proxy and executing an operation on the service proxy. Thus, from the client's perspective, the service proxy is simply the service (i.e., the back-end resource).

As shown in FIG. 5, the service proxy 82 has the following responsibilities: bind to the service locator, find an appropriate service using the service locator, obtain a worker using the service object, and execute the service request using the allocated worker. In particular, the service proxy 82 can bind to the service locator by using the service locator's instance name. After binding to the service locator, the service proxy 82 caches the reference of the service locator for subsequent lookup. Each service has a property called the instance name, which represents the name of the service which does not change for a particular service. Because the service proxy 82 has a one-to-one correspondence with a particular service, the service proxy 82 knows the instance name of the service it represents. The service locator includes a repository of handles to services that have been instantiated by the SM. The service proxy 82 uses the getService operation, passing the name of the service instance, to obtain a service handle. These operations will return the handle to a suitable service if available. Once it obtains a handle to a service, the service proxy 82 caches the reference for subsequent lookup.

In some embodiments, the service proxy 82 uses a default set of reservation properties when reserving a worker. A client is allowed to change the reservation properties before issuing any operations on the service proxy 82 and at any subsequent time. The worker ID (e.g., handle to the worker) of the reserved worker is cached along with the reservation context that contains the client ID, the service, and the reserved worker, as discussed further below with respect to FIG. 10. The reservation context is passed automatically by the service proxy 82 on each outgoing call. Thus, the service proxy 82 also hides the internal details such as reservation properties, reservation context, etc. The service proxy 82 may perform invalidation of cached references periodically in order to detect any changes in the configuration (e.g., new service locators, new service clones, new workers). Invalidating the cache periodically also forces the service proxy 82 to talk to the service locator periodically and therefore improves the effectiveness of the service locator and the service object in performing dynamic workload balancing. The client may also be allowed to, at any time, invalidate the cached worker service and the cached service locator handles.

Figure 6:
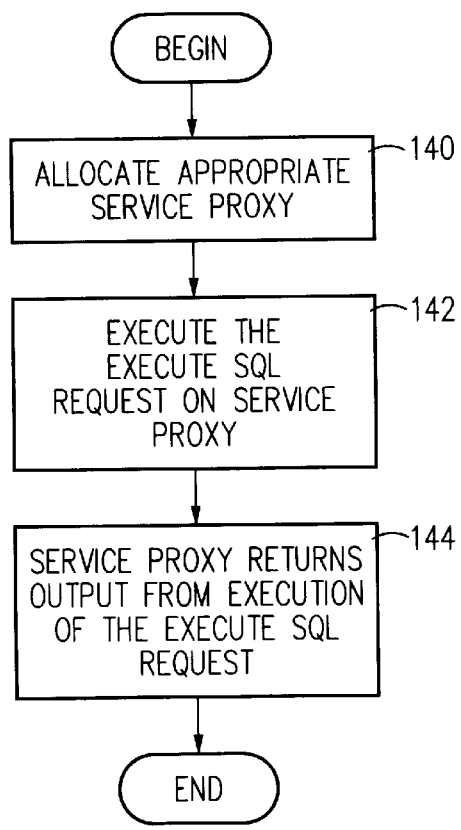
FIG. 6 is a flow diagram illustrating the operation of the client of FIG. 3 during a service request in accordance with some embodiments of the present invention.

FIG. 6 is a flow diagram illustrating the operation of the client 80 of FIG. 3 during a service request in accordance with some embodiments of the present invention. In particular, FIG. 6 illustrates the operation of performing a service request from the perspective of the client 80 of FIG. 3. Reference numeral 140 refers to a first stage in this embodiment. In stage 140, the client 80 requests a service, and the appropriate service proxy intercepts the service request (as discussed above). In stage 142, the client executes the execute SQL request on the instantiated service proxy (e.g., the service proxy includes the same methods included in the workers of the requested service, and the service proxy executes the request on the allocated worker). Finally, in stage 144 (the worker returns the output from the execution of the execute SQL request to the service proxy of the client, and) the service proxy forwards the output to the client. Accordingly, the service proxy 82 encapsulates the requested service operation, which significantly simplifies the operation from the perspective of the client.

FIG. 7 shows a service object 160 of the server 88 of FIG. 3 in accordance with another embodiment of the present invention. In particular, in response to an allocateWorker call by the service proxy on the service object 160, the service object 160 allocates a worker from its worker pool, workers 162 and 164, to the service proxy so that the service proxy can issue work requests. The service object 160 may use an LBM (load balancing manager), as discussed further below with respect to FIG. 25, to select a worker for the service proxy, then the service object 160 calls newClient on the selected worker 162 to notify the worker of the reservation. Also, if the service proxy wants to release the reserved worker 162, then the service proxy calls releaseWorker on the service object 160, and the service object 160 calls clientReleased to notify the worker 162. Each service object (in some embodiments, there is only one service object per service) controls its own pool of workers. Thus, the service object 160 controls the pool of workers including workers 162 and 164. In some embodiments, worker allocation is implemented to support a variety of modes of access to workers, provide fast response time, and balance the workload from client requests across all workers in the worker pool.

In particular, the workers 162 and 164 encapsulate a limited resource such as an RDBMS. The service object 160 provides access to the limited resource and ensures that all clients get their fair share of access to the limited resource. For example, worker should be relatively equally loaded at all times to ensure reasonably predictable throughput and linear scalability. Ignoring hardware and operating system scalability limitations, adding more workers may increase throughput. Accordingly, to handle these requirements, the service object 160 may include a worker reservation mechanism as discussed further below.

FIG. 8 provides a call to allocateWorker on a service object in accordance with some embodiments of the present invention. The call to allocateWorker on a service object includes parameters for specifying the service, the service properties, and the reservation context. In particular, the reservation context provides some history of the client. For example, any particular workers that have performed work for the client may be provided in the reservation context. Thus, the service can allocate the same worker to a client that had previously done work for the client. In some embodiments, a worker may cache work results and worker hints respecting a particular client ID so that if the same worker is reallocated to the client, then the worker has this information already cached with respect to the client. Accordingly, caching work results and worker hints would be particularly advantageous for a data service or any other service in which the client would benefit by returning to the same worker that cached previous work results. Also, the reservation context may include a client ID and security credentials for clients. Thus, for security reasons, the service can actually recognize a client using the client ID. The client ID is discussed further below with respect to FIG. 10.

FIG. 9 provides reservation properties 166 in accordance with some embodiments of the present invention. In particular, a client can reserve a worker in the mode that is most suitable to the task to be performed by the client. Thus, some or all of the reservation properties 166 provided in FIG. 9 may be implemented. In particular, the service object 160 of FIG. 7 implements a reservation interface, as discussed further below with respect to FIG. 12. During the period that the worker is reserved for a particular client the client is allowed access to the worker. Once the reservation expires the client is no longer allowed access to the worker. Accordingly, to reserve a worker, the client issues a request specifying the reservation properties that apply to the reservation and any worker hints that the client would like to pass on to the service object.

As shown in FIG. 9, the reservation properties 166 include a client priority, an access mode, a wait mode, and a reservation time. The reservation properties 166 control the type of reservation that the client would like to obtain before the worker attempts to perform the desired action. Reserving the worker in the appropriate mode is critical. For example, if the worker allows multiple clients for read access, but a single client for write access, the client performing a write operation must reserve the worker in exclusive mode. The reservation duration can be passed as a hint (e.g., a parameter provided in a call or method invocation) by the client for worker scheduling purposes. For example, the service object may prefer a short duration client over a long duration client. In some embodiments, there is no fixed time duration that classifies a request as short or long, and thus, this is simply up to the client's discretion.

Referring to FIG. 9, the client priority determines how quickly the client can obtain a worker. In some embodiments, the worker pool that is instantiated by the service object contains workers of high, medium, and low priority as discussed further below with respect to FIG. 27. The properties of the worker pool determine how many workers are instantiated and how many of each priority. In some embodiments, a high priority worker can only be used by a high priority client, a medium priority worker can be used by high and medium priority clients, and a low priority worker can be used by clients of any priority. Thus, a high priority client waits only for any existing high priority clients. Hence, it is up to the client to decide its priority level before issuing the request.

Referring to FIG. 9, the access mode determines how many concurrent reservations can be given out on a particular worker. The maxClients property is a property of the workers that determines the number of concurrent reservations in shared mode that may be allocated to the worker (i.e., workers with maxClients greater than one represent multi-threaded workers). In exclusive mode, only one reservation is permitted. Accordingly, the access mode facilitates the maximum number of concurrent accesses to a limited resource.

Referring to FIG. 9, the wait mode specifies the appropriate action if a suitable worker is not available. For example, the client can elect to wait in a queue indefinitely until a suitable worker is available (e.g., indefinite_wait), the client can elect to wait for a limited time period before re-obtaining control (e.g., timed_wait), or the client may simply choose not to wait at all (e.g., no_wait).

Referring to FIG. 9, the reservation time specifies the duration of the reservation (in mSec). The client obtains a reservation for a worker. The reservation is guaranteed for the reservation time (i.e., the reservation cannot be revoked during this time period). However, choosing a long time period has its consequences. For example, if the client were to disappear or exit due to an error, the worker is locked for this time period. This is undesirable in situations in which the worker is transient (e.g., JAVA applets). A more stable client (e.g., a transaction manager) may choose to use a longer reservation time. On the other hand, choosing too short of a reservation time may cause frequent revocations and interruptions in the work being performed.

FIG. 10 provides a reservation context 168 in accordance with some embodiments of the present invention. In some embodiments, the client 80 of FIG. 3 passes a reservation context 168 on each call to the service object 90 of FIG. 3. The reservation context 168 contains information about the client, the service, and the last worker that was reserved. The service object 90 of FIG. 3 uses the reservation context as a hint when allocating a worker. Once a worker is allocated, the service object 90 of FIG. 3 modifies the worker key with the reserved worker ID. The worker checks the reservation context 168 to make sure that the client key is present and keeps track of clients that have reserved the worker. The worker also verifies if the client has a valid reservation (e.g., the reservation has not been revoked).

In particular, the reservation context 168 as shown in FIG. 10 includes a client key, a service key, and a worker key. The client key identifies the client, the service key identifies the service object that returned the previous reservation, and the worker key identifies the previously reserved worker.

For example, if the client had previously reserved a worker, but the reservation has expired and the client would like to, if possible, return to the same worker, then the client simply passes the worker key as a hint to the service object's reservation mechanism. The service object will try to allocate the hinted worker if it is available. If not, the service object may allocate the next available worker in the worker pool.

The client can modify the reservation properties 168 using the setReservationProperties operation of the service object's reservation interface. For example, the setReservationProperties operation can be used to extend an existing reservation before the reservation expires or to change the mode of reservation from exclusive to shared once the critical updates in a database have been completed.

FIG. 11 provides service properties 180 in accordance with some embodiments of the present invention. In particular, service.instanceName provides the instance name of the service. Service.label provides the user visible name of the service. Service.description provides a description of the service. Service.serviceID uniquely identifies the service. Thus, multiple services with the same instance name and properties will have a different value for service.serviceID. Service.processLocation provides whether the service is in process or out of process (e.g., indicating whether or not the service will be launched in its own virtual machine (VM)). For example, a C++ object is preferably launched outside a JAVA VM. Service.type provides the JAVA class name of the service. Thus, service.type indicates the class to instantiate to bring up the service. Service.numWorkers provides the number of workers maintained by the service. Service.numHighPriWorkers provides the number of high priority workers maintained by the service. Service.maxWorkerRestarts provides the maximum number of times a service will attempt to restart a failed worker. Service.launchSequence provides that the lower the number the earlier the SM will launch the service (e.g., the results may be ambiguous if there are two services with the same launch sequence). Service.inactiveManagerInterval provides the minimum number of milliseconds before a service considers its parent SM dead and terminates itself.

FIG. 12 provides a reservation interface of the service object 90 of FIG. 3 in accordance with some embodiments of the present invention. The reservation interface shown in FIG. 12 is written in standard Interface Definition Language (IDL).

Figure 13:
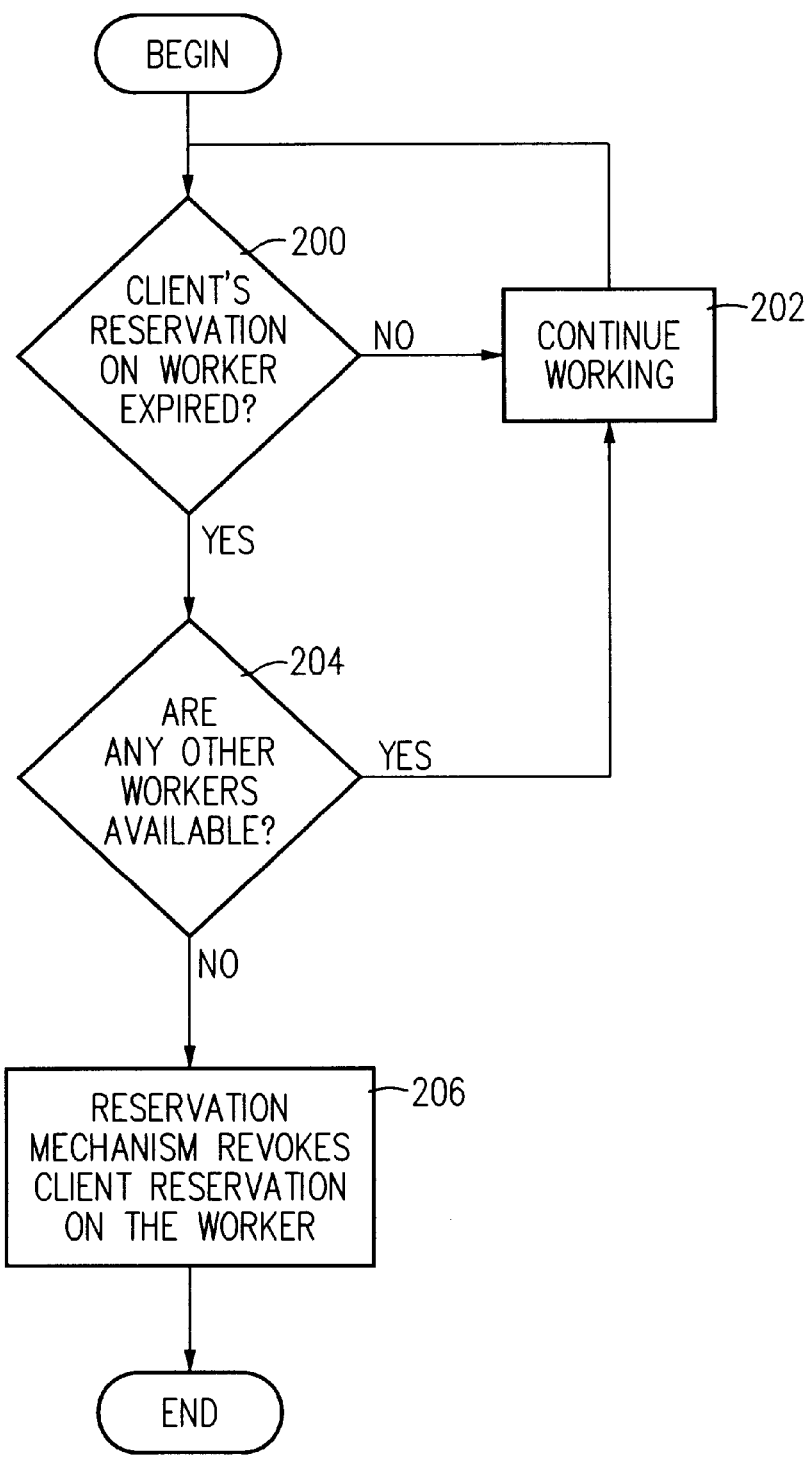
FIG. 13 is a flow diagram illustrating the reservation revocation operation in accordance with some embodiments of the present invention.

FIG. 13 is a flow diagram illustrating a reservation revocation operation in accordance with some embodiments of the present invention. For example, the service object 90 of FIG. 3 may include a reservation mechanism that performs the reservation revocation operation (i.e., asynchronous reservation revocation). In particular, if a worker reservation has expired, the client whose reservation expired is not immediately denied access to the worker. Reference numeral 200 refers to a first stage in this embodiment. In stage 200, the reservation mechanism determines whether or not a client's reservation on a worker has expired. If the client's reservation on the worker has not expired, then as shown in stage 202 the client may continue to use the worker. However, if the client's reservation on the worker has expired, then as shown in stage 204 the reservation mechanism determines whether or not other workers are available. In particular, this allows the client to continue to use the worker until no workers are available for a new client. In stage 206, the reservation mechanism revokes the client's reservation on the worker assuming that, at this time, there are no workers available for new clients, and a new client is requesting a worker (i.e., all the workers in the pool have been reserved by maxClients clients or clients in exclusive mode). Thus, in stage 206, the reservation mechanism revokes a reservation of a client whose reservation period has expired.

In some embodiments, a reservation is revoked only if there are no available workers (i.e., every worker has the maximum number of clients reserved), and there is at least one expired reservation. If there are no available workers, then the reservation mechanism will revoke the oldest-expired reservation on the least-loaded worker.

In particular, reservations can be revoked only if the period specified in the reservation properties has expired. Reservations cannot be revoked if the reservation time of FIG. 9 has not expired. Thus, the client can continue to use the worker until the worker is revoked. Once a reservation has been revoked, the worker now has room for at least one more client. This available slot is given to a new client that requested a worker. Such a revocation causes a call back notification to be sent to the client's service proxy. As discussed above, the client's service proxy for the service encapsulates the entire worker reservation logic. The service proxy uses the notification to invalidate any cached worker handles. Accordingly, any further request on the service proxy from the client will cause the service proxy to obtain a new reservation for a worker before proceeding with the request.

Figure 14:
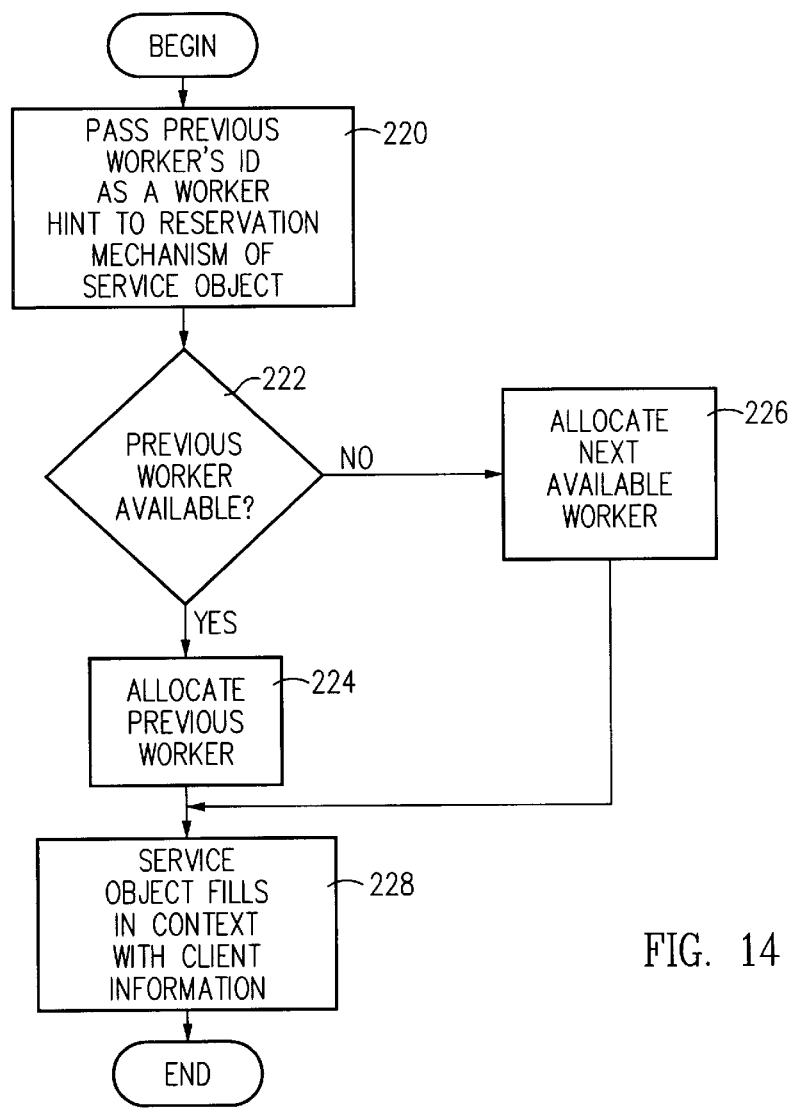
FIG. 14 is a flow diagram illustrating the operation of reserving a previously reserved worker in accordance with some embodiments of the present invention.

FIG. 14 is a flow diagram illustrating the operation of reserving a previously reserved worker in accordance with some embodiments of the present invention. Reference numeral 220 refers to a first stage in this embodiment. In stage 220, the client passes the worker ID of the previously reserved worker (e.g., in the worker key of the reservation context 168 of FIG. 10) as a worker hint to the reservation mechanism (e.g., of the service object 90 of FIG. 3). In stage 222, the service object will attempt to allocate the previously reserved worker if it is available. In stage 224, if the previously reserved worker is available, then the service object allocates the previously reserved worker as provided in the hint. However, if not, then the service object simply allocates the next available worker, in stage 226.

As discussed above with respect to FIG. 10, the reservation context 168 of FIG. 10 contains information about the client, the service, and the previously reserved worker. The service object uses the reservation context as a hint when allocating a worker. Thus, in some embodiments, once a worker is allocated, the service object fills in the reservation context with the reserved worker ID, as shown in stage 228 of FIG. 14. The worker also may check the reservation context to make sure that the client ID is present and to keep track of clients that have reserved the worker. The worker may also verify if the client has a valid reservation (e.g., that the reservation has not been revoked).

Figures 15, 17:
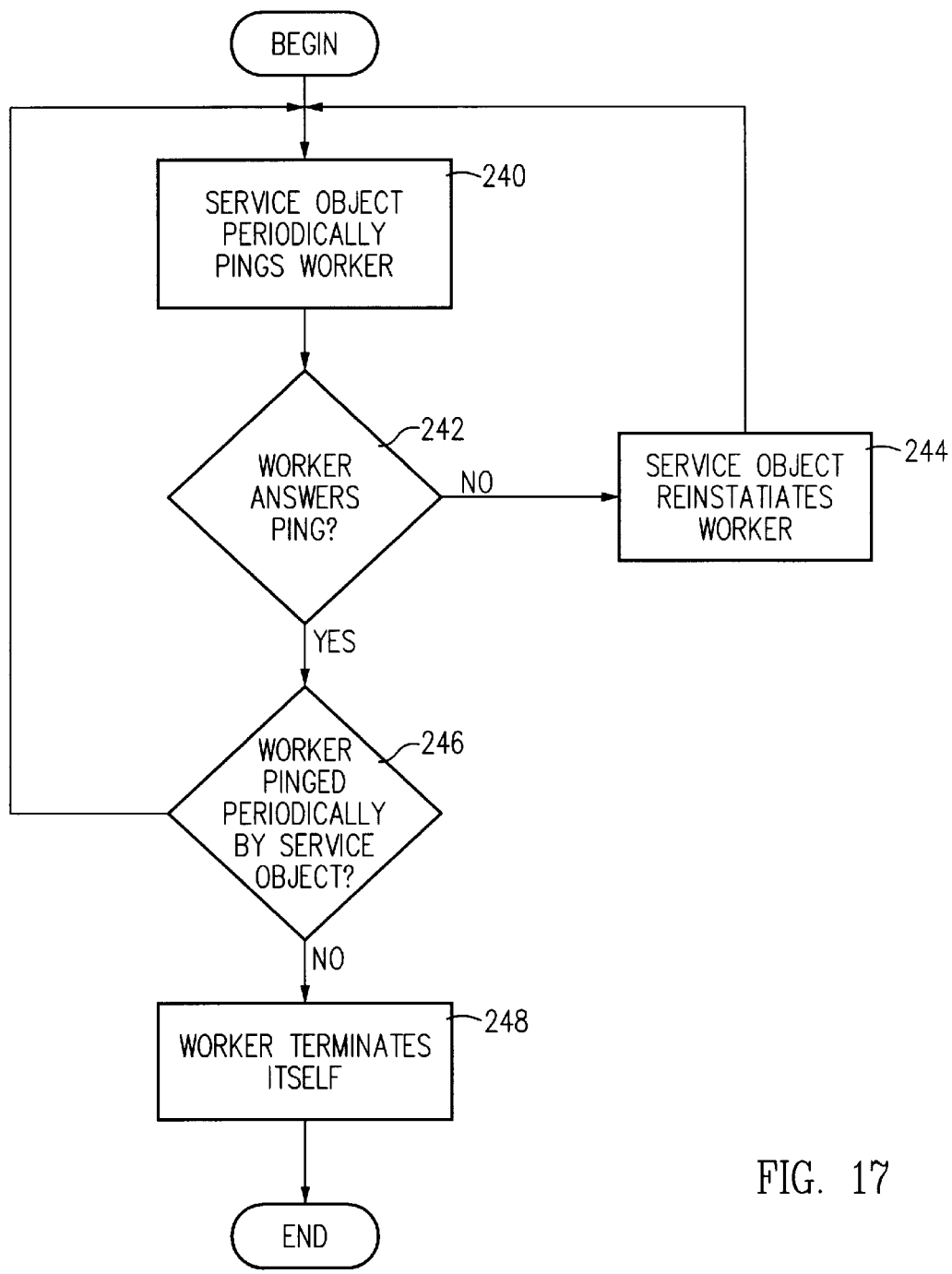
FIG. 15 provides a reservation revocation call back interface in accordance with some embodiments of the present invention.
FIG. 17 is a flow diagram illustrating the operation of pinging workers in accordance with some embodiments of the present invention.

FIG. 15 provides a reservation revocation call back interface in accordance with some embodiments of the present invention. The reservation revocation call back interface as shown in FIG. 15 is written in IDL.

In some embodiments, a call back notification mechanism increases scalability. For example, a client can continue to use an expired reservation until the concurrent load on the system increases to a level at which reservation revocations begin to occur. Thus, a client may not release a worker even after obtaining a new reservation, and still not cause new clients problems when trying to access a limited resource. Even if the call back notification fails to reach the client, the worker will still be notified of the revocation. If the service proxy issues a request to the worker using an expired reservation, the worker raises an exception indicating this problem. In particular, as discussed above with respect to FIG. 14, the worker checks the reservation context of each client that attempts to use the worker. Thus, the service proxy, upon receipt of the exception raised by the worker will obtain a new reservation and retry the request. Of course, once the reservation of the client expires, the service object is free to revoke the client's reservation and offer the reservation to some other client. When such an event occurs, a notification is sent to the client's service proxy that holds the reservation. The client's service proxy can then invalidate the worker reference immediately. Any new operations performed on the service proxy will force it to allocate a new worker before dispatching the operation.

Accordingly, a service proxy obtains a reservation on a worker object and may not release the worker until there is a lack of free workers and there are competing clients for the workers. In other words, if a service proxy has reserved a worker and there is no contention for the worker, the service proxy may never release the worker. In such a case, the service proxy does not issue releaseWorker and allocateWorker requests to the service object, and the service proxy simply continues to use the worker object until no longer needed. If there is a worker contention and a reservation has to be revoked, then the reservation revocation callback interface is used and a callback is issued to the service proxy that is holding the worker (e.g., the reservation time of FIG. 9 has expired).

Figure 16:
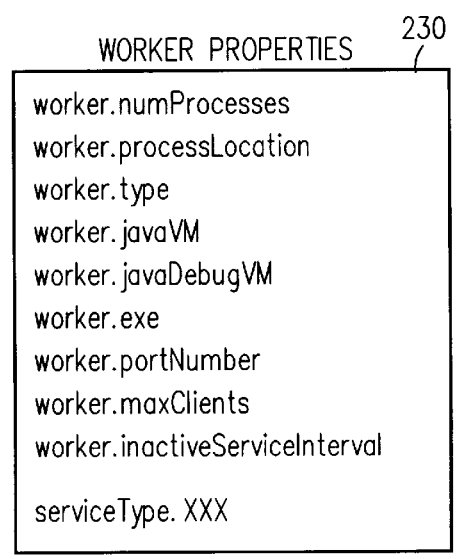
FIG. 16 provides worker properties in accordance with some embodiments of the present invention.

FIG. 16 provides worker properties 230 in accordance with some embodiments of the present invention. As discussed above, the workers provide an encapsulation of a limited resource. Like the service object, the worker interface derives from the administrative (admin) layer. For example, the service object 90 of FIG. 3 uses the worker's admin layer to activate and deactivate the workers 92, 94, and 96. The worker interface implements operations that allow the service to notify the worker about its reservations. The worker uses the reservation information (e.g., reservation properties 166 of FIG. 9 and reservation context 168 of FIG. 10) to disallow unexpected or expired clients from accessing the worker. The worker also keeps track of clients that have reserved the worker and ensures that the number of clients does not exceed maxClients. The service instantiates the worker either in process or out of process as discussed further below with respect to FIG. 19. Once the service object instantiates the workers into the worker registry, the service object calls setProperties to pass on the worker properties. Once the worker receives the properties and initializes the internal data structures such as the worker's client list, the worker is ready to receive client requests.

In particular, the worker properties 230 are provided in FIG. 16. For example, worker.numProcesses provides the number of processes to start up to support the number of workers supported when the workers are out of process. In some embodiments, the numworkers divided by the numProcesses equals the numWorkersPerProcess. Worker.processLocation is either in process or out of process indicating whether the workers will run in the same VM as the service. Worker.type indicates, for example, the JAVA class that will be instantiated for JAVA workers (either in process or out of process). Worker.javaVM specifies the JAVA VM used to launch worker.type for out of process JAVA workers. Worker.javaDebugVM is the default command to run the JAVA VM in debug mode (e.g., JAVA_g-debug). Worker.exe indicates the command line to launch (C++) out-of-process workers.

Worker.portNumber is the port number on which out of process workers receive requests. A port number represents a numbered network connection. For example, a telephone number is a port number in the telecommunication network. The Internet is based on the TCP/IP network protocol. Thus, in the Internet context, the port number is local to a server (i.e., unique within the server), and the port number is a unique integer that represents the IP address of the network connection to the server. For example, an allocated worker listens for an incoming request on the IP address of the network connection, and the incoming request may be an operation that is exported by the worker in the IDL interface of the worker.

Worker.maxClients is the maximum number of simultaneous clients that are allowed access to a single worker. If the maxClients value is greater than 1, then the worker is thread safe (i.e., multi-threaded).

Worker.inactiveServiceInterval is the number of milliseconds before the worker considers its service dead and exits. In particular, each worker is periodically pinged by the service object, and the pinging interval depends on the service's pingInterval property (i.e., the Service.pingInterval period is less than the Worker.inactiveServiceInterval period). The pinging of workers may be used to obtain runtime workload statistics from the workers for workload balancing purposes and also to obtain the current state of the workers. For example, if a worker has failed for some reason, the state indication will help the service object restart the worker and bring the worker back online, which represents part of the fault tolerance aspects of the service framework of the present invention. Thus, if the worker is not pinged by the service object within the Worker.inactiveServiceInterval property, then the worker assumes that the service object is no longer online, and the worker terminates itself. The worker terminates itself, because the service object may have failed without terminating its workers. If the service object failed, then the SM that monitors the failed service will restart the failed service, and the restart of the failed service will cause the original worker pool to be stranded, and thus, the worker terminates itself to avoid being stranded.

ServiceType.XXX for each service is expected to have its own properties (prefixed by the service type), and there can be an arbitrary number of these properties. In particular, the serviceType.XXX property is a property of a service identified by serviceType. For example, the "RDBMS Data Service" has a service type DataService and has a property pinginterval that defines how frequently the DataService will ping its workers. Thus, this property has a name (e.g., DataService.pingInterval), and the property has a value (e.g., 200 seconds). In some embodiments, the properties are implemented in JAVA and stored in a properties file, and the service manager is responsible for reading and writing the stored properties.

FIG. 17 is a flow diagram illustrating the operation of pinging workers in accordance with some embodiments of the present invention. Reference numeral 240 refers to a first stage in this embodiment. In stage 240, each worker of a service is pinged by the service periodically. In stage 242, it is determined whether or not the worker answers the ping within a predetermined time period. If the worker does not answer the ping within the predetermined time period, the service object considers the worker to be dead and re-instantiates the worker, as shown in stage 244. Each worker also includes a service object ping interval timer. In stage 246, a worker determines whether the service object has pinged the worker within a particular time interval. If not, then the worker considers the service object to be dead and the worker terminates itself as shown in stage 248. Otherwise, the pinging operation repeats as shown in FIG. 17. Accordingly, the pinging operation provides fault tolerance in the service framework of the present invention.

Figure 18:
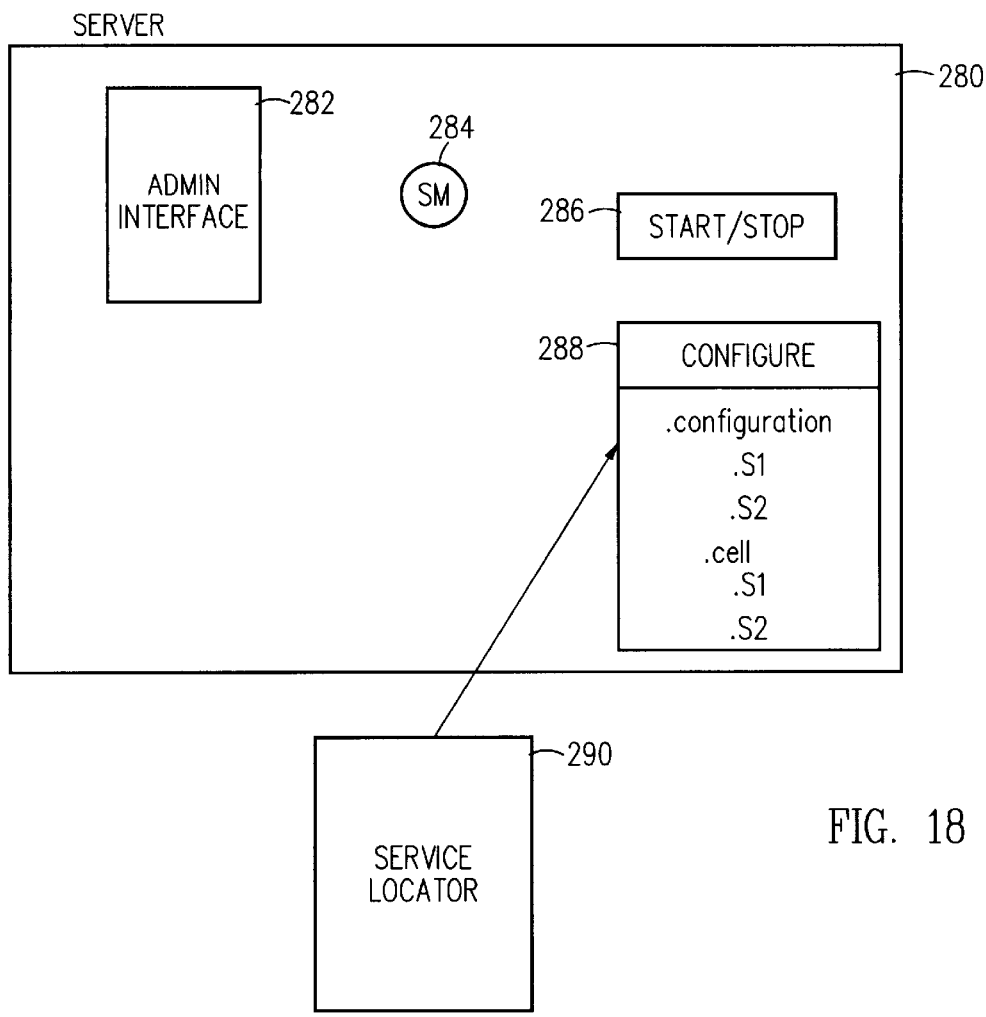
FIG. 18 shows a server in accordance with another embodiment of the present invention.

FIG. 18 shows a server 280 in accordance with another embodiment of the present invention. In particular, a server 280 includes an admin interface 282, a SM 284, a start/stop functionality 286, and a configuration 288. Because the service framework is based on a distributed object model, and there can be many objects in the service framework that interact with each other, it is preferred to group objects together into a higher level entity so that the distributed objects can be more effectively managed. Accordingly, the configuration 288 includes a collection of services and service locators along with their properties. The configuration 288 is maintained by the SM 284. In particular, when the SM 284 comes up, it comes up with a specified configuration of services and service locators, such as a service locator 290.

For example, a configuration may contain the following services: an RDBMS service with two clones, a session/state management service with one worker, and a service locator with three clones. The configuration is then given a name, and the property files for each service instance in the configuration are stored within the configuration.

Referring to FIG. 18, the configuration 288 includes a cell. A cell represents a distributed configuration. Two hosts with the same configuration name but different contents can link up together to form a single cell. The cell is designated by a list of hosts that the configuration spans. Once the configurations are linked into a cell, the set of service locators and services is common to the entire cell (i.e., each service locator contains a list of all services in all hosts in the cell). Thus, clients accessing any service locator in the cell can access any service in the cell. The cell is maintained in a consistent manner by the SM managing the individual configurations. SM operations may include many different functions such as managing the service and service locator instances, providing fault tolerance by pinging as discussed above with respect to FIG. 17, and exporting a management interface to administer the services.

Referring to FIG. 18, the management interface can be used by administrative tools to change the SM's configuration (e.g., add a new service, change service locator clones, etc.). Thus, the management interface can be used to modify the operations of any of the entities in the configuration (e.g., change numworkers for an RDBMS service). Finally, the management interface offers mechanisms 286 to start/stop each instance of a service or service locator and obtain the current state of each of the instances in the configuration.

Further, the service locators are linked to the configurations. Thus, a service locator in a configuration on a particular server actually knows about services on another system, the distributed configuration or the cell. Thus, if a request for a service is made to the service locator 290, then a client can actually get access to a service provided by the server 280, but may also be provided access to a service instance in the cell which is residing on a server that may be anywhere on the network (e.g., the global Internet). Moreover, this entire process is transparent to the client, because the client's service proxy is simply returned a service handle.

However, the SM 284 is only responsible for services in its own configuration 288. Thus, the SM 284 is responsible to supply the information regarding its configuration 288 to all service locators in the cell. The service locators in the cell are well known (i.e., they are actually embedded in the cell's description itself). Thus, given a cell, a connection can be made to service locators in the cell. Thus, the SM 284 knows the list of services, loads this information and the properties of the service, and simply forwards such information periodically to the service locator 290. Thus, the service locator 290 can assume that the information provided from the SM 284 represents currently available services.

Figure 19:
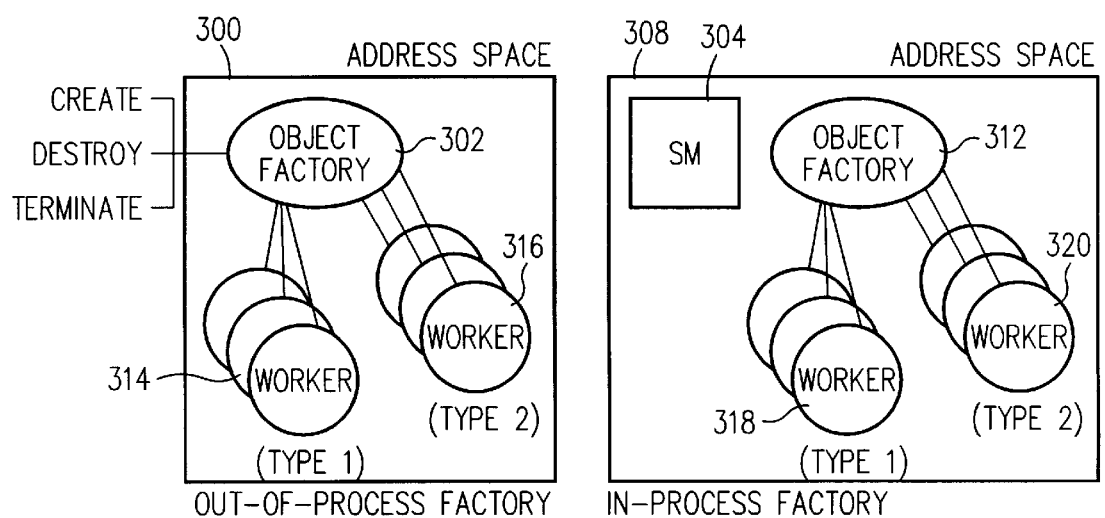
FIG. 19 shows an out-of-process worker factory and an in-process worker factory in accordance with some embodiments of the present invention.

FIG. 19 shows an out-of-process factory 300 and an in-process factory 308 in accordance with some embodiments of the present invention. The number of workers instantiated by the service is limited by the service property service.numWorkers. All the workers may be of the same type or of different types (e.g., high priority and low priority workers). The workers are instantiated when the service is initialized by the SM (i.e., the properties of the service and the workers are passed to the service object). Workers can be instantiated in a separate process or within the same process as the service object as shown by out-of-process factory 300 and in-process factory 308, respectively. Workers are instantiated by using worker object factories, as shown by an object factory 302 and an object factory 312.

The object factory is an object that can instantiate or fabricate any number of objects of a given type. For example, in an object-oriented language like JAVA or C++, to instantiate an object is to create a new object using the "new" syntax operator, and in CORBA, a CORBA object is instantiated using the "obj_is_ready" operation defined in CORBA. A worker object factory such as the object factory 302 and the object factory 312 can instantiate any number of worker objects. In particular, the object factory 312 is a CORBA object that can be in the same process (in process). Thus, the service object (e.g., the service object 90 of FIG. 3) can then use the object factory 312 to create type 1 workers 318 (e.g., low priority workers) and type 2 workers 320 (e.g., high priority workers). In some embodiments, the object factory 312 is a CORBA object implemented in JAVA.

Referring to FIG. 19, the object factory can also be in a separate process (out of process), in which case, the service object spawns (forks) a separate process, and the process then instantiates an object factory and passes a handle to the object factory back to the creator. In particular, the spawned process creates the object factory, registers the object 302 (i.e., the object factory) with the ORB, and passes a reference to the object back to the parent process using the standard I/O string. The object and the parent process (e.g., the service object 90 of FIG. 3) that spawned the object factory process use the object reference of the object factory to instantiate the necessary objects in that process (e.g., the worker pool). Thus, the service object can then use the object factory 302 to create type 1 workers 314 and type 2 workers 316. In some embodiments, the object factory 302 is a CORBA object implemented in JAVA.

Thus, the object factory is a flexible mechanism to create and manage pools of similar objects (i.e., objects that have the same type and the same set of properties) such as worker pools. In some embodiments, object factories are used to create the service objects (in the SM), the worker pools (in the service), and other objects such as the service locator.

In some embodiments, the object factory is a remote CORBA object that is implemented in JAVA and C++. Thus, a JAVA-based factory can instantiate any CORBA object that is implemented in JAVA and instantiates the object in the same address space as the factory. Accordingly, if the factory object is in a separate address space, any objects created in the factory are in the separate address space of the factory object (i.e., in the separate process). Because the JAVA-based factory object can instantiate any JAVA-based CORBA object, the same JAVA-based factory may be used to instantiate a service locator (e.g., a JAVA-implemented CORBA object) or a service object (e.g., a JAVA-implemented CORBA object) and, thus, reside in the same address space.

In contrast, in some embodiments, an object factory implemented in C++ is more limited in function than a JAVA-based object factory, because the object factory implemented in C++ can only instantiate similar objects (e.g., due to limitations of the C++ language). For example, the DataService workers are implemented in C++, and the DataService worker objects are instantiated in a separate process using the object factory implemented in C++. Thus, the object factory implemented in C++ can only instantiate DataService worker objects.

In another embodiment, the number of workers can fluctuate dynamically using an object factory. Thus, new workers can be added or the number of workers can be reduced, based on parameters such as the workload on the existing number of workers. In particular, the configuration (e.g., the configuration 288 of FIG. 18) may provide a minimum or maximum range of the number of workers for a service, and the number of workers can be implemented to fluctuate dynamically within the configured range depending on various parameters such as the workload on the present number of workers.

FIG. 20 shows clone factories in accordance with some embodiments of the present invention. An object factory can instantiate basically any CORBA object. The object factory instantiates a CORBA object using CORBA (and JAVA) introspection to determine the type of object to be created and its parameters (e.g., object name). The SM uses this functionality to create clone factories. In particular, a clone is another instance of an entity that behaves exactly like the original entity (i.e., the clone has the same properties or attributes as the original entity) but resides in a different address space. For example, a service locator clone is another instance of the service locator object in the same machine, and the service manager may instantiate a service locator clone in the same machine for fault tolerance purposes (e.g., if one service locator instance fails, the other service locator instance is still available).

Referring to FIG. 20, a SM 321 has created clone factories 322 and 324. The SM 321 creates factories for each service and service locator. Each clone of a service (or service locator) is located in a different clone factory. For example, if there are multiple clones for a service, the first may be located in the clone factory 322, the second in the clone factory 324, etc.

For example, two service locator clones and two service clones (e.g., of the DataService) may be provided. Each clone has a clone ID. Thus, one service locator clone instance may have a clone ID 0, and the other service locator clone instance may have a clone ID 1. Similarly, one DataService instance may have a clone ID 0, and the other DataService instance may have a clone ID 1. The SM 321 instantiates these clones. In particular, the SM 321 instantiates two object factories, one for clone 0 instances and the other for clone 1 instances. The two clone factories may be in different address spaces (processes), which provides fault tolerance in the service framework of the present invention (e.g., insuring that no two clones are in the same address space provides fault tolerance). The clone factory 0 instantiates the service locator clone 0 and the DataService clone 0. The clone factory 1 instantiates the service locator clone 1 and the DataService clone 1. In some embodiments, a service can have any number of clones, and the SM 321 will instantiate the appropriate number of clone factories.

Generally, a process represents an operating system term that may also be used to refer to an address space. In particular, operating systems such as HP-UX™ or Windows NT™ use the term process to refer to a region of computer memory that is separated from the rest of the computer's memory (e.g., allocated memory). Thus, a region of memory is allocated to a program that is being executed. The program is launched by executing an executable file (e.g., .exe in Windows NT). Once the program terminates, the region of memory is deallocated and returned to the computer's memory pool. A program needs a region of memory to maintain data that it has read from the terminal, file system, or from the network. The program manipulates the data and performs its work all within the allocated region of memory. Accordingly, a process is a program that is executing within a region of memory allocated by the operating system. Thus, an out-of-process worker represents a worker object that is instantiated in a process that is separate from the process where the service object resides. An out-of-process service object represents a service object that resides in a process that is separate from the process where the SM object resides. Clone factories represent a set of factory objects with each factory residing in a separate process.

Accordingly, clone factories such as the clone factories 322 and 324 of FIG. 20 provide additional fault tolerance for the service framework of the present invention. In particular, clone factories are located in different processes so that each clone provides additional fault tolerance and high availability. Once the service object (e.g., the service object 90 of FIG. 3) instantiates a worker pool, the service object pings the workers to make sure that the worker pool is alive and well, as discussed above with respect to FIG. 17. If a worker in the pool does not respond to the pings, the service object re-instantiates the failed worker using the appropriate factory. Also, it should be apparent that two clones may be implemented on the same machine. Such an implementation would be useful for providing fault tolerance. In particular, a clone provides basically an identical worker pool, thus, providing the same or nearly identical work as the original worker pool. As a result, if a process or VM is lost, the state that the clients have set up is not completely lost. In particular, in such an event, because the clients are distributed among the clones on the same machine a loss of a process or VM on a particular server will affect some of the clients but not all of the clients attached to the server. Hence, if a particular address space fails abnormally, then clones may advantageously provide for fault tolerance and high availability, because clones in different address spaces may not have been affected. Accordingly, the service framework of the present invention provides a fault tolerance architecture.

FIG. 21 provides an object factory interface in accordance with some embodiments of the present invention. The object factory interface of FIG. 21 is written in IDL.

FIG. 22 provides service locator properties 330 in accordance with some embodiments of the present invention. As discussed above with respect to FIG. 20, service locators may be cloned, but the service locator clones may not communicate with each other. A service locator proxy keeps track of the various service locators in the network and can select the service locator with a minimum workload on which to perform its service lookups. In some embodiments, the service locator proxy is used by almost all the modules in the framework including the service proxy to encapsulate access to the service locator. Thus, the service locator proxy provides another level of workload balancing management in the service framework of the present invention.

The service locator properties 330 are shown in FIG. 22. In particular, sl.javaVM is the VM command line used to launch the out-of-process service locators, sl.javaDebugVM is the default command to run the JAVAVM in debug mode, sl.inactiveManagerInterval is the minimum number of milliseconds that can elapse before the service locator considers the VM out of service and unregisters its services, sl.locatorid is the unique identifier of the service locator (e.g., the service locator instance's object name), and sl.owningManagerId is the identifier of the owning manager (e.g., the SM 86 of FIG. 3 assuming that the SM 86 launched the service locator).

FIG. 23 provides a service locator interface in accordance with some embodiments of the present invention. In particular, FIG. 23 provides a service locator interface written in IDL.

FIG. 24 provides a load balancing manager (LBM) interface in accordance with some embodiments of the present invention. The LBM interface may be written in IDL as provided in FIG. 24. The LBM is an entity of the service object. In particular, the service object instantiates an LBM to manage the pool of workers. The LBM may be a plug-in object that can be customized or entirely replaced.

The LBM provides a level of workload balancing in the service framework of the present invention. In particular, the service object may use the LBM to perform workload balancing among its workers in the worker pool. In some embodiments, the service framework provides two managers, a fully capable LBM and a null LBM. The fully capable LBM supports access modes (e.g., exclusive mode) and also provides a sophisticated scheduling scheme based on worker statistics. In contrast, the null LBM does not support access modes (i.e., the null LBM treats them all as the same and randomly selects a worker from the pool of workers). If a service encapsulates a limited resource, the fully capable LBM would be preferred. However, if the service encapsulates an abundant resource (e.g., provides more than one worker 92 per service), or if there is the constraint that there may be only one worker per service, then the null LBM would be sufficient and would improve performance.

In addition, the LBM acts as a repository of worker objects. The service object creates the workers in the worker pool and registers each worker with the LBM. In particular, each worker in the worker pool, as soon as it is launched, is registered with the LBM using the registerworker method. Even though the LBM is an entity of the service object, the worker is registered with the LBM, because the LBM may be a plug-in object, so it may be independent of the service object (i.e., does not share internal data with the service object). Once the worker is terminated, the service object unregisters the worker from the LBM's registry using the unregisterworker method, and the service object may terminate the worker pool.

Figure 25:
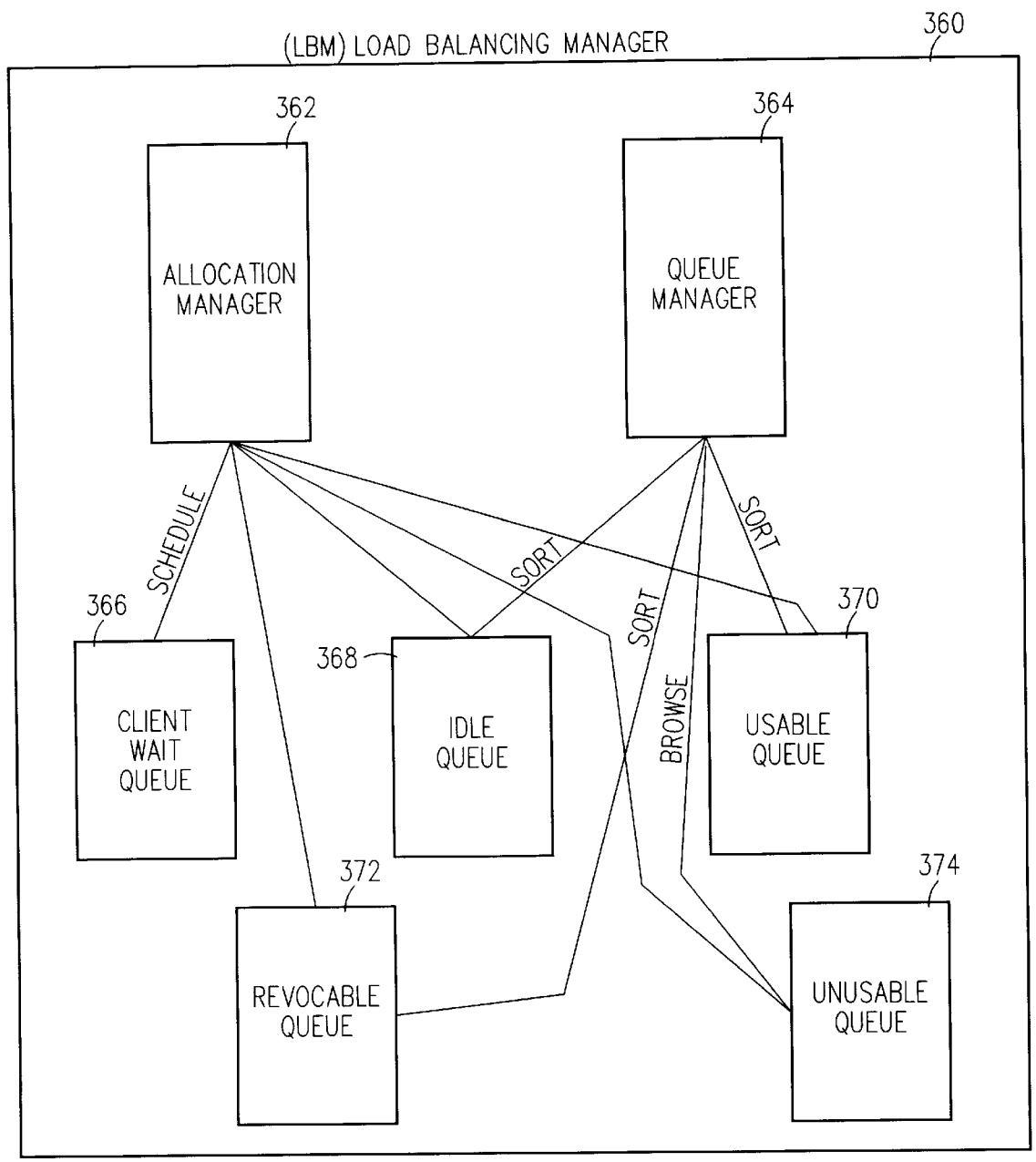
FIG. 25 shows a fully capable LBM in accordance with some embodiments of the present invention.

FIG. 25 shows a fully capable LBM 360 in accordance with some embodiments of the present invention. The fully capable LBM uses a sophisticated scheme of priority queues and a scheduler, an allocation manager 362, to implement the allocateWorker and releaseWorker methods. The service object (e.g., the service object 90 of FIG. 3) simply forwards these requests to the registered LBM. The fully capable LBM 360 includes five priority queues. In particular, an idle queue 368 contains workers that have no client reservations. In the idle queue 368, workers may be sorted in increasing order of workload.

In some embodiments, the workload value of a worker is a floating point number computed by the worker that represents the load on the worker. In particular, the workload value may be determined by a calculation based upon such factors as the ratio of time spent in executing a worker method to the elapsed time and the CPU load. The elapsed time represents the time between pings from the service object to the worker (e.g., the value provided by the property service.pingInterval). The time spent in executing a method is calculated by summing the time spent in any operation in the worker. Thus, the ratio of the elapsed time to the time spent in executing a worker method provides an indication of the ratio of time that was spent by the worker actually performing a worker method. The CPU (central processing unit or processor) load is the time spent by the computer in performing work. Accordingly, the combination of these two factors provides a measure of the workload on the worker and the workload on the CPU.

Referring to FIG. 25, the usable queue 370 contains workers that have some client reservations, but the number of clients for each worker is less than the maxClients. In the usable queue 370, workers may be sorted in increasing order of a combination of workload and available client reservation slots. An unusable queue 374 contains workers that have client reservations with the number of clients equal to maxClients per worker (i.e., no more reservations are possible against such workers). In some embodiments, the unusable queue 374, is not sorted. A revocable queue 372 contains workers that have one or more reservations that have timed out and can be revoked if necessary. In the revocable queue 372, workers may be sorted based on the time of reservation expiration (i.e., workers containing older revocations are higher in the queue). A client wait queue 366 contains clients that are waiting for a worker to be allocated. In some embodiments, all workers are initially in the idle queue 368, and as reservations are handed out, the workers are moved into the usable queue 370, the unusable queue 374, and the revocable queue 372 as appropriate.

Referring to FIG. 25, in some embodiments, the five queues are managed by two background threads, a queue manager 364 and an allocation manager 362. The queue manager 364 handles the tasks of maintaining a sorted order on each of the worker queues (except the unusable queue 374 which is not sorted), as described above. The queue manager 364 periodically browses the unusable queue 374 and looks for expired reservations. If a worker in the unusable queue 374 has an expired reservation, the worker is moved to the revocable queue 372, but the expired reservation is not yet revoked.

Referring to FIG. 25, the allocation manager 362 is the scheduler that manages the client wait queue 366. In some embodiments, the allocation manager 362 maintains the client wait queue 366 in first come first serve (FCFS) order, but maintains the discretion to move clients forward based on their declared duration (i.e., based on the reservation properties such as the access mode, the reservation time, etc., as discussed above with respect to FIG. 9). For example, shorter duration requests are generally moved ahead of longer duration requests. Also, the LBM may move workers into the revocable queue if the workers have clients holding reservations with them that have expired (e.g., based on the reservation timeout). In some embodiments, the allocation manager 362 handles various client wait modes such as no_wait, timed_wait, and indefinite_wait as discussed above with respect to FIG. 9. The allocation manager 362 also scans the worker queues waiting for an available worker.

In some embodiments, the allocation manager 362 checks for any worker hints supplied in the waiting client's reservation context and first attempts to reserve the hinted worker. If the hinted worker is unusable, then the allocation manager 362 attempts to reserve the next available worker. If a worker is available in the idle queue 368 or the usable queue 370, then the allocation manager 362 immediately allocates the available worker to the waiting client. If no workers are available in the idle queue 368 or the usable queue 370, then the allocation manager 362 scans the revocable queue 372 waiting for new workers to appear. If the first available worker is a worker in the revocable queue 372, then the allocation manager 362 allocates the revocable worker to the waiting client after revoking the expired reservation (e.g., the first worker in the revocable queue 372 is selected for a revocation and the oldest expired reservation is revoked). The revocation involves a notification to the affected worker using the clientRelease call and a callback to the client that holds the expired reservation using the reservationTimedOut call on the ServiceProxy callback interface.

Figure 26A:
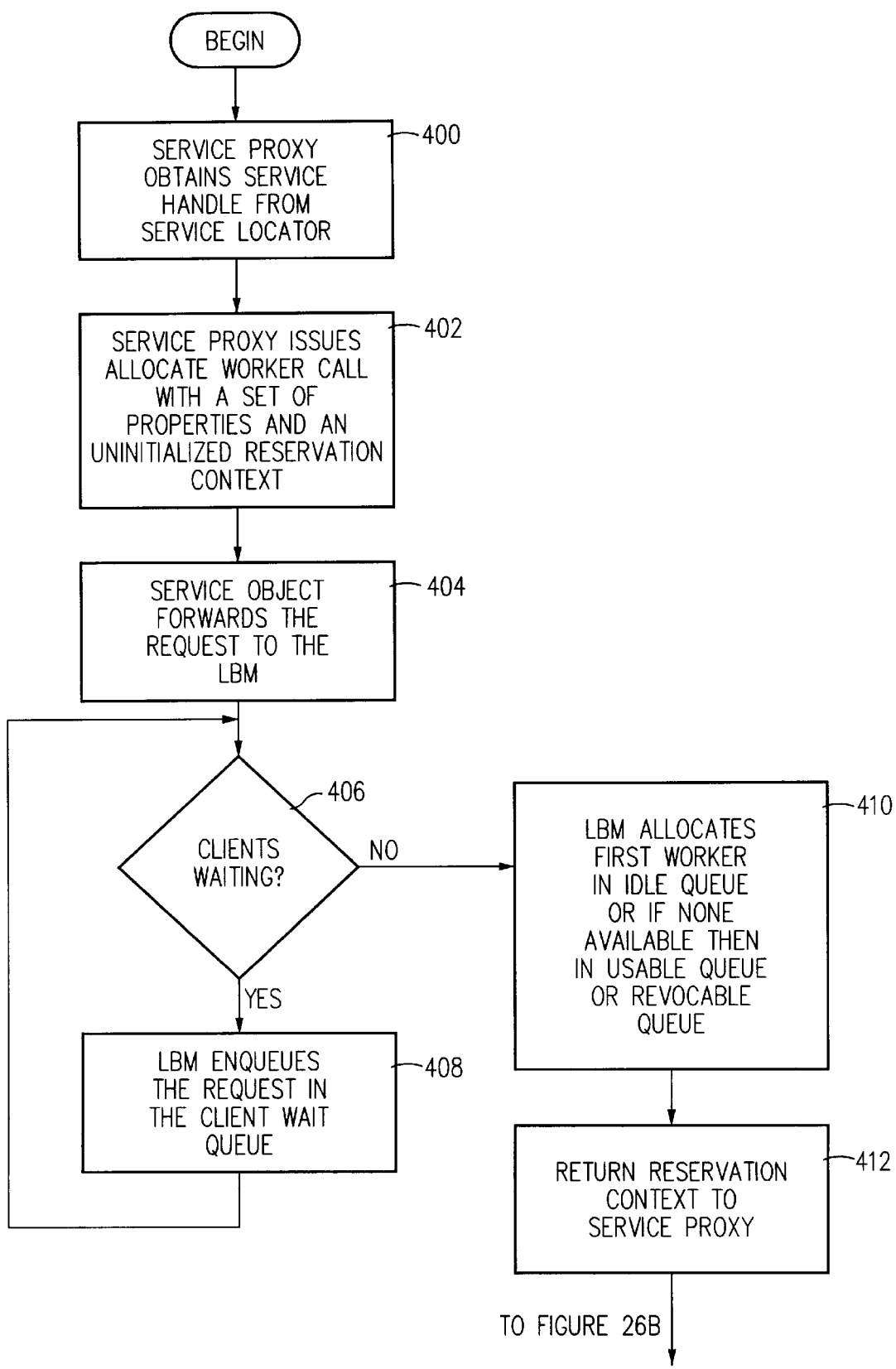
FIGS. 26A–26B are a flow diagram illustrating the call sequence operation in accordance with some embodiments of the present invention.
Figure 26B:
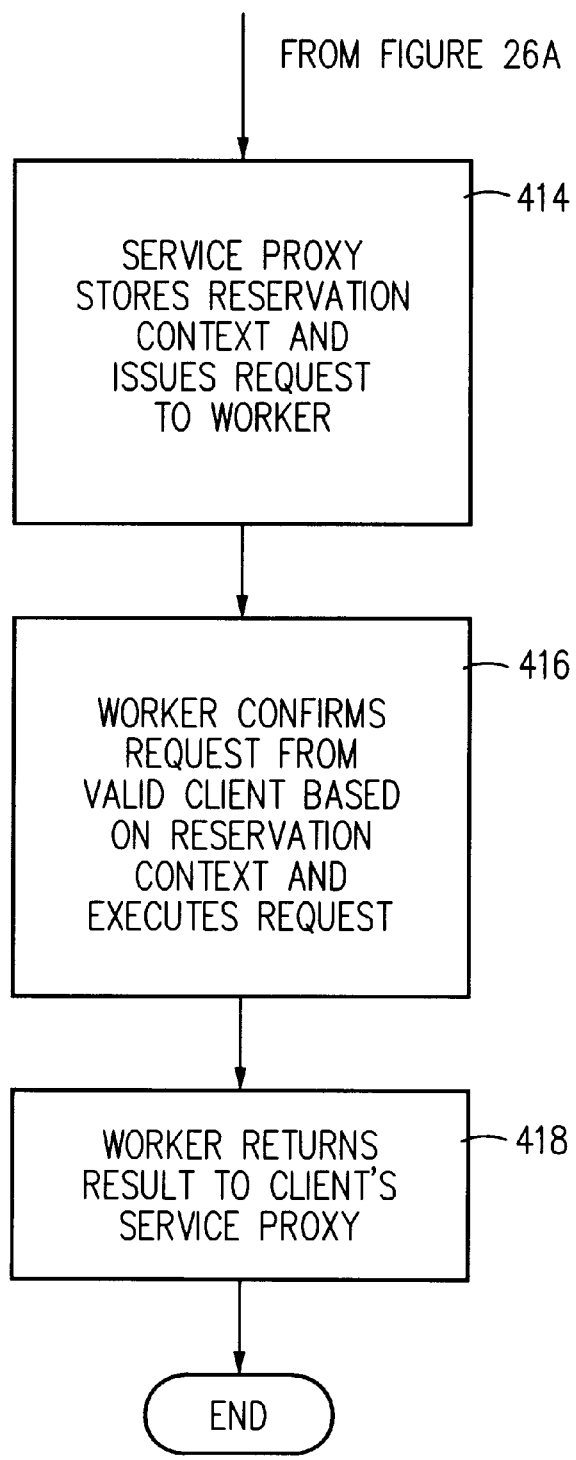

FIGS. 26A–26B are a flow diagram illustrating the call sequence operation in accordance with some embodiments of the present invention. In stage 400, assuming a client proxy does not already have a reserved worker for a service request, the service proxy obtains a service handle from the service locator. In stage 402, the service proxy issues the allocateWorker call with a set of reservation properties and an uninitialized reservation context. In stage 404, the service object forwards the request to the LBM 360. In stage 406, the LBM determines if any clients are waiting. If clients are waiting, then the LBM enqueues the request in the client wait queue in stage 408. Otherwise, the LBM proceeds to stage 410.

Referring to FIG. 26A, in stage 410, the LBM attempts to allocate a worker from the idle queue or the usable queue, but if no workers are available, then the LBM attempts to allocate a worker from the revocable queue. In particular, the reservation context is uninitialized, so that there are no worker hints available. Thus, the LBM takes the first entry in the idle queue. If the idle queue is empty, then the LBM checks the usable queue. If the usable queue is empty, then the LBM checks the revocable queue. If no workers are available in the revocable queue, then the LBM checks the unusable queue to see if any workers have expired reservations. If so, the LBM moves a worker with an expired reservation to the revocable queue.

Once a worker is available in the revocable queue, the LBM selects the first worker in the revocable queue for a revocation and revokes the oldest expired reservation. The revocation involves a notification to the affected worker using the clientRelease call and a callback to the client that holds the expired reservation. Once a worker with a free reservation is available (e.g., in the revocable queue, the usable queue, or the idle queue), a new reservation is created for the client with the appropriate reservation properties. The worker is notified of the new client and its reservation properties, and the reservation context is appropriately modified (e.g., the reservation context may include current information in the client key, the service key, and the worker key). The affected worker moves to the appropriate queues (e.g., from the idle queue to the usable queue or the usable queue to the unusable queue, etc.). Thus, in stage 412, the call to allocateWorker returns with a suitably filled reservation context.

Referring to FIG. 26B, in stage 414, the service proxy stores the reservation context and then issues the request to the worker with the reservation context. In stage 416, the worker receives the request, verifies the request using the reservation context (e.g., checks whether the client has valid access to the worker, that is, the worker is notified by the service object of the reservation), and then executes the request. Finally, in stage 418, the worker returns the result of the request to the client's service proxy which provides the result to the client.

Figure 27:
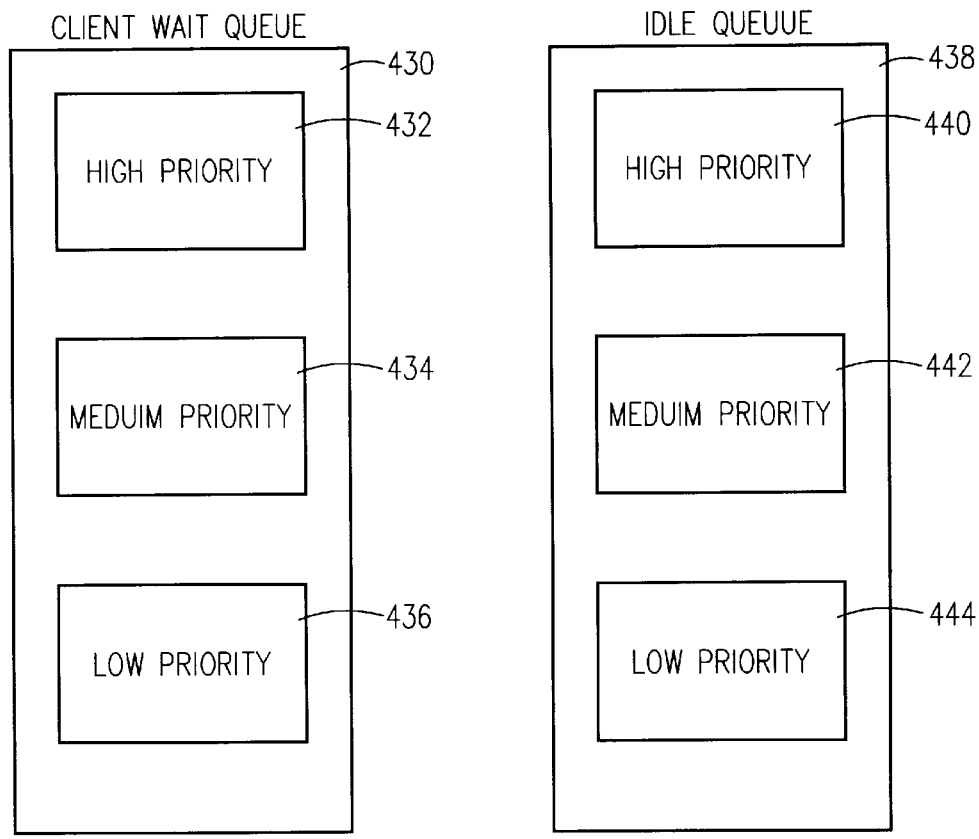
FIG. 27 shows a client wait queue and an idle queue of the LBM of FIG. 25 in accordance with another embodiment of the present invention.

FIG. 27 shows a client wait queue 430 and an idle queue 438 of the LBM 360 of FIG. 25 in accordance with another embodiment of the present invention. In particular, as shown in FIG. 27, the client wait queue 430 may include three internal queues, one for each priority level, high priority 432, medium priority 434, and low priority 436. Similarly, the idle queue 438 may include three internal queues, one for each priority level, high priority 440, medium priority 442, and low priority 444. Further, each queue of the LBM 360 of FIG. 25 may be similarly implemented to include priority sub-queues. Thus, if a client comes with a high priority request, the client's request is entered into the high priority client wait queue 432 of the client wait queue 430. In some embodiments, the allocation manager always services the high priority requests ahead of the lower priority requests. Also, in some embodiments, workers are assigned a priority. Thus, high priority workers only work for high priority clients, and the high priority workers are initially entered in the high priority idle queue 440 of the idle queue 438. When workers are moved from one queue to another, they are moved into the appropriate priority sub-queue. Accordingly, this embodiment provides yet another level of workload balancing in the service framework of the present invention.

In some embodiments, each reservation session has a specified durationTimeout attribute in the reservation properties. The reservation session represents a particular reservation that a service proxy of a client holds on a worker. The service object records the reservation session and uses the information in the session to control the reservation (e.g., revoke the reservation once the timeout expires). In particular, the reservation may include reservation properties provided by the service proxy on the allocateWorker call, and the reservation context, which is sent back and forth between the proxy and the service on all calls. The reservation context includes the client key (identifies the service proxy uniquely), the service key which identifies the service object itself, and the worker key which identifies the worker uniquely within the service. Once the service object reserves a worker for a client, the service object marks the worker key in the reservation context. Further, the LBM may store the reservation session as soon as the reservation on a worker is given to the client.

Every service proxy has to supply a valid durationTimeout value when calling allocateWorker. The durationTimeout determines the length of time (in milliseconds) that the service object (e.g., the service object 90) guarantees the worker to stay reserved for this client from the moment the worker has been allocated. If the client has a set of operations to be called that must be executed on the same worker instance, then this set of operations must be completed within the durationTimeout interval for that work to be guaranteed. Once this interval expires, the service object may revoke the reservation of this client and offer the worker to another client that is waiting for a worker to become available.

Moreover, there are some optimizations in the reservation mechanism to reduce the number of calls made by the service proxy to the service. In some embodiments, once the durationTimeout expires, the client does not immediately lose the worker reservation (i.e., asynchronous reservation revocation). The client loses the reservation only if there exists a contention. If there are other clients waiting for the worker, the client that has an expired durationTimeout may lose the worker. If there is no contention, the client's reservation is usually still valid, and the client can keep using the worker. If the service object decides to revoke the reservation, then the service object issues the reservationTimedOut call to notify the service proxy. The first subsequent operation on the service proxy will try to reserve a new worker before executing the requested operation.

In addition to the durationTimeout, in some embodiments, there is another time-out attribute in the reservation properties, an inactiveTimeout. The inactiveTimeout detects idle clients and revokes their reservation. If a service proxy that has reserved a worker has not used the worker within the inactiveTimeout interval, then the worker notifies the service object, and the service object may revoke the worker and assign it to another client that is waiting for the worker. If the worker is revoked, then the service proxy is notified of the revocation using the reservationTimedOut call. In some embodiments, such a revocation occurs only if there is contention for workers. In some embodiments, the difference between the durationTimeout and the inactiveTimeout is that the durationTimeout is handled by the service object whereas the inactiveTimeout is handled by the worker.

Figure 28:
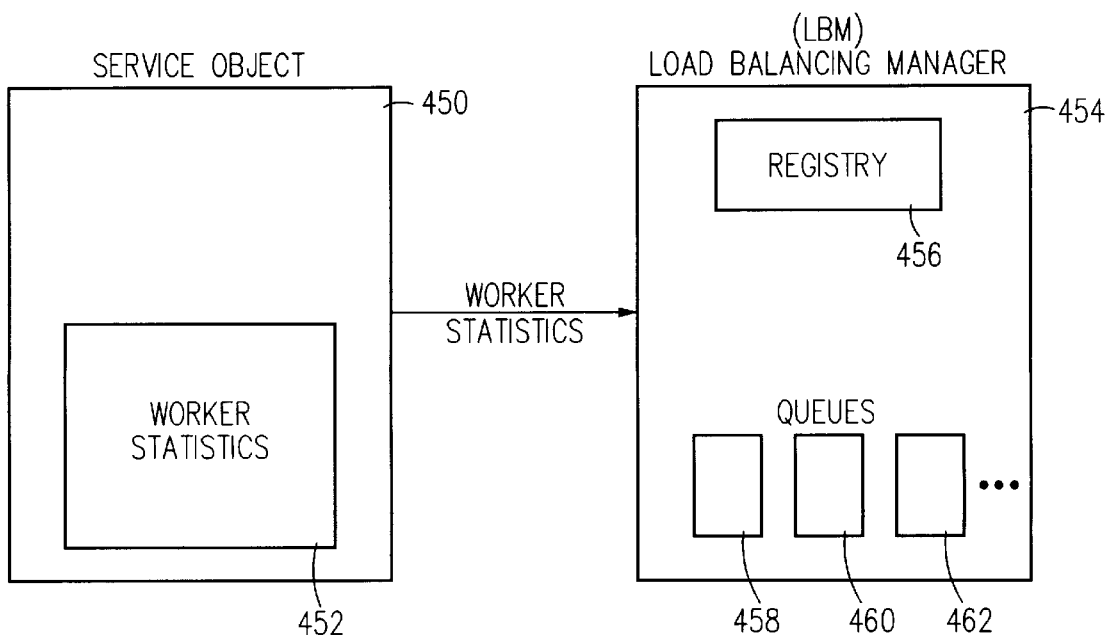
FIG. 28 shows a service object and an LBM in accordance with another embodiment of the present invention.

FIG. 28 shows a service object 450 and an LBM 454 according to another embodiment of the present invention. In particular, the service object 450 periodically pings each worker in the worker pool to obtain worker statistics 452 such as the workload of each of the workers. The service object 450 supplies the worker statistics 452 to the LBM 454 which uses the worker statistics 452 for workload balancing. For example, the LBM 454 may use the workload statistics 452 to sort the worker queues 458, 460, and 462 such as the idle queue, the usable queue, and the unusable queue. If the service object ping fails on a particular worker, then the worker is unregistered from the LBM's worker registry 456 by the service object, and all existing reservations on the worker are revoked by the service object 450. The service object 450 will then re-instantiate the worker and register the reinstantiated worker in the LBM's registry 456.

The service object 450 maintains the runtime statistics of each worker and constructs representative service statistics based on the worker statistics 452 such as the average of the worker numbers for certain statistics (e.g., workload). The service object 450 periodically forwards this information to the parent of the SM in response to the periodic pings from the SM (i.e., the parent of the SM is the SM that instantiated the service object). The SM periodically passes the service statistics along with the service information to the service locators in the cell that are responsible for distributing the object references of the registered services. These periodic updates are responsible for keeping the service locator's repository up to date.

Figure 29:
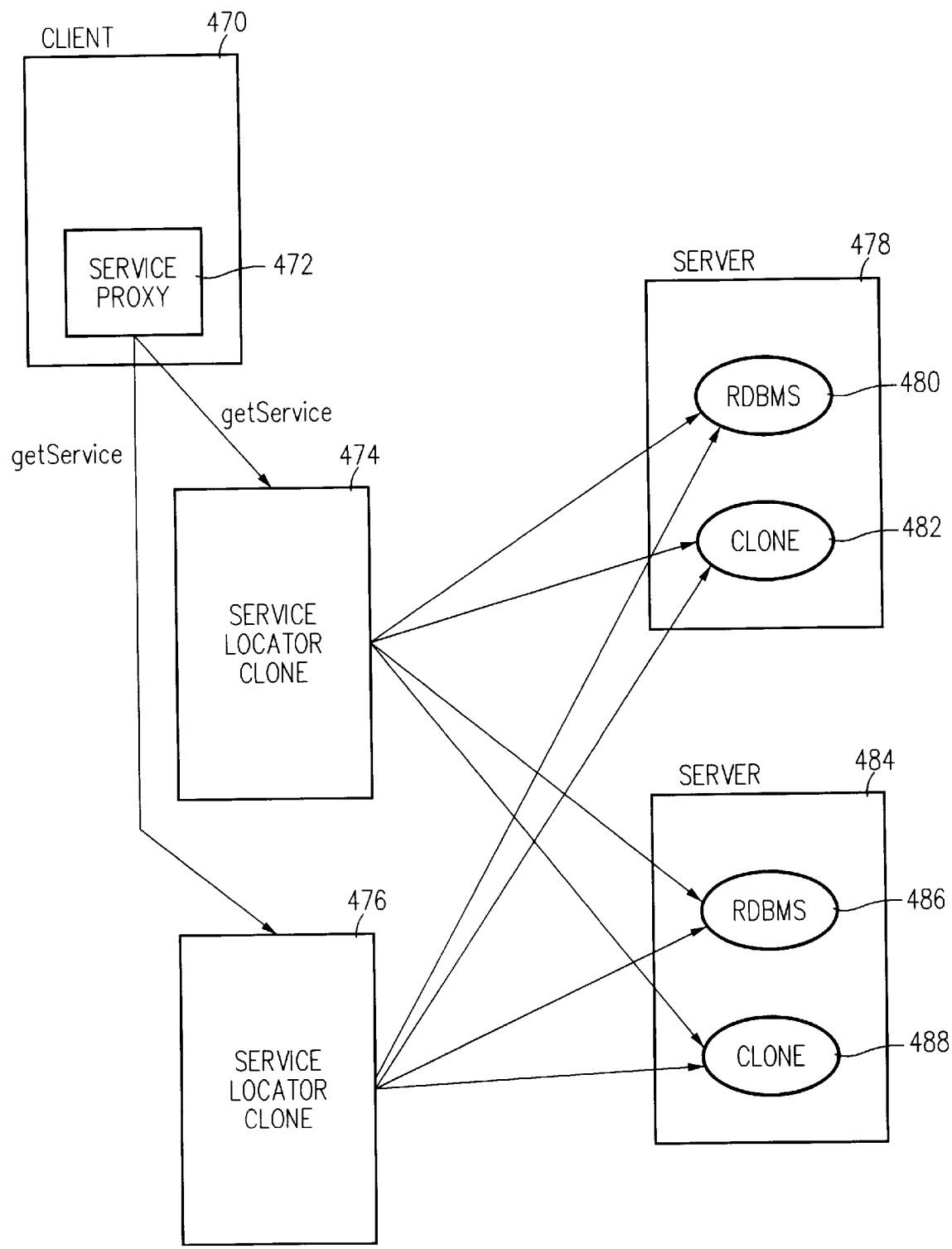
FIG. 29 shows the scalability of the service framework in accordance with some embodiments of the present invention.

FIG. 29 shows the scalability of the service framework in accordance with some embodiments of the present invention. The service framework of the present invention is based on a scalable architecture. In some embodiments, the service framework includes a variety of features that enhance scalability such as clones (e.g., service locator clones, service clones, etc.), multiple workers, multi-threaded workers (discussed above), asynchronous revocation callbacks (discussed above), and distributed configurations or cells (e.g., services that are part of the same administrative framework may be distributed across multiple machines as described above with respect to FIG. 18).

Scalability can improve throughput almost linearly, ideally, with the addition of resources. For example, in a SM that manages one instance of an RDBMS service, adding another instance of the service should double throughput, in the ideal case. Such an increase in throughput should be linear as additional service instances are added. However, in practice, scalability does not increase linearly because of bottlenecks in the system that arise as the number of resources increase significantly. Also, the network bandwidth and the CPU power are limited and therefore inhibit a linear increase in scalability.

As shown in FIG. 29, the service framework of the present invention can increase scalability by providing service locator clones and service clones. A clone is another instance of an object that is essentially identical to the original instance. All clones use the same set of properties. For example, a clone of a service represents another instance of the service object with its own worker pool. The two instances of the service are quite independent and will perform their own reservations and execution of requests. Typically, clones live in different address spaces in computer storage. Accordingly, if a clone goes down for some reason, it normally does not affect the other clones. Thus, clones also introduce another level of fault tolerance in the service framework of the present invention. In some embodiments, each service has a property that determines the number of clones for the service. The SM starts all clones of a service when the service is started. Clones are applicable to any SM managed instance (e.g., a service locator instance). A SM managed instance represents an instance that the SM instantiated and which the SM periodically pings.

In particular, FIG. 29 provides a service locator clone 474 and a service locator clone 476. If there are multiple service locator clones, the SM registers the service information with all available service locator clones. Thus, each clone is capable of providing handles to any service in the network. Thus, a service proxy 472, residing in a client 470, that needs to bind to, for example, an RDBMS service can send a getService request to any one of the service locators, the service locator 476 or the service locator clone 474, thereby balancing the workload among the multiple service locator instances. of course, multiple service locator instances, possibly on different servers, can also be provided. This would further increase scalability if, for example, a particular server becomes CPU-bound (i.e., processor bound).

FIG. 29 also shows multiple service clones residing in different servers. In particular, FIG. 29 shows a service clone 482 for an RDBMS 480 residing in a server 478 and a service clone 488 for an RDBMS 486 residing in a server 484. Each service can have a number of service clones (e.g., specified by the numClones property of the service). Each clone of the service is a full instance of a service (e.g., contains a service object and a pool of workers). Accordingly, additional service clones improves throughput by balancing the workload among the service clones.

In some embodiments, the numWorkers property of a service controls the number of workers that can be instantiated for the service. Each worker implements the functionality of the service and thus encapsulates the functionality of the service. For example, a worker for the DataService implements the DataService interface (e.g., executeSQL or executeStoredProcedure). Thus, the worker for the DataService may differ from a worker for another service. Concurrent access to each worker is controlled by the maxClients property of the worker. Multiple workers can be instantiated in the same process which allows multiple clients to work concurrently on multiple workers. In particular, multiple workers in the same process means that there are multiple workers (e.g., multiple worker CORBA objects) instantiated in the same process by the service object. For example, if a worker can only support one reservation at a time (e.g., the worker.maxClients property is set to 1), and there is only one worker in the process, then only one client can perform work in that process at a time. If there are two workers in the process, then two clients can perform work in that process. If the two workers are in two different processes, then two clients can perform work concurrently, but in each process, there is only one client active at a time.

Generally, a thread-safe program (code) is a program that supports any number of threads in the same program (i.e., a thread is an operating system term that indicates a thread of control in a process). Thus, if the code of a worker for a service is not thread-safe (i.e., the worker only supports one client at a time), only one client can perform work on the worker at a time. The service framework of the present invention allows multiple clients to perform work on an instance of a service even though the workers for the service are not thread-safe. For example, multiple workers may be instantiated in different processes so that multiple clients can perform work on the service using these workers. Moreover, multiple workers may be instantiated in the same process so that multiple clients may perform work on the service using these workers. Accordingly, the service framework of the present invention allows for multiple clients to perform work on the service using non-thread-safe workers without requiring the creation of multiple processes.

As the number of workers increases, the throughput generally increases, particularly for workers that are heavily serialized internally. Generally, serialized internally means that certain sections of the code of the worker are called critical sections, which are sections of code that are not thread-safe. Each client accessing a worker represents a thread. Thus, a critical section only supports one client at a time. If a worker has a large number of critical sections, or if a significant segment of the code of the worker is a critical section, then throughput may suffer, because each client must process the critical section(s) of the worker one at a time. Thus, if a worker is serialized internally, then each critical section serializes access to particular code of the worker and thus bottlenecks may reduce throughput. Thus, a worker with no critical sections may have higher throughput, because multiple clients can access the worker concurrently. Of course, additional workers may be instantiated to support concurrent access by additional clients. However, the higher the number of workers, the greater the overhead in the service itself, because the service object must collect the workload from all the workers in order to perform workload balancing of the workers and worker reservation management.

Further, redundancy through the use of clones as shown in FIG. 29 also provides increased fault tolerance in the service framework of the present invention. For example, the service framework can isolate and withstand faults generated by worker implementations, and the service framework has a high-availability feature to tolerate downtimes. In particular, in some embodiments, the service framework provides for fault isolation. For example, workers (e.g., workers implemented in C++ or JAVA) are prone to fault generation, but the faults are isolated so that the faults do not affect the running (current) configuration. The worker fault isolation can be accomplished in various ways: each worker can be located in a separate process using the numProcesses property and the numworkers property (i.e., an out-of-process worker), and thus a fault generated by the worker would be isolated. Thus, because there can be multiple instances of almost every entity (e.g., service locator, SM, service, worker, etc.), faults within any particular address space can be tolerated. Hence, a death of a service instance can be tolerated without a complete outage if clones of the service are present and registered with the service locator. Any work performed on the service instance at the time of death may be lost and any dependent work may be affected, but clients issuing requests to other clones of the service will not be subject to any interruptions. Similarly, service and service locator instances can be distributed across multiple machines thereby isolating machine or network area faults as well. Accordingly, services as well as workers can be launched out of process thereby providing for fault isolation (e.g., distribution among different address spaces), or services as well as workers can be launched in process thereby providing for optimal memory usage.

Further, in some embodiments, the service framework includes an automatic restart feature that enhances the fault tolerance of the service framework of the present invention. In particular, every object factory can instantly restart a failed object in the event of a failure. For example, if a worker fails in an abnormal manner, the object factory restarts the worker immediately. Accordingly, the failure and the subsequent restart would be apparent only to the service proxy of the client that had been using the failed worker at the time of the failure.

In addition, the service framework of the present invention also provides high availability. In particular, the service framework supports redundancy at the worker and service object levels (e.g., worker clones and service clones). In some embodiments, multiple workers can be configured for a service (e.g., multiple workers can be instantiated based on the numworkers property of the service), multiple service clones can be configured (e.g., defined in a service property such as service.numClones), and multiple service locators can be configured. The number of service locator instances in an SM may be defined by a service locator property such as serviceLocator.numClones (e.g., if the service locator has numClones set to 2, then the SM instantiates 2 service locator clones).

Figure 30:
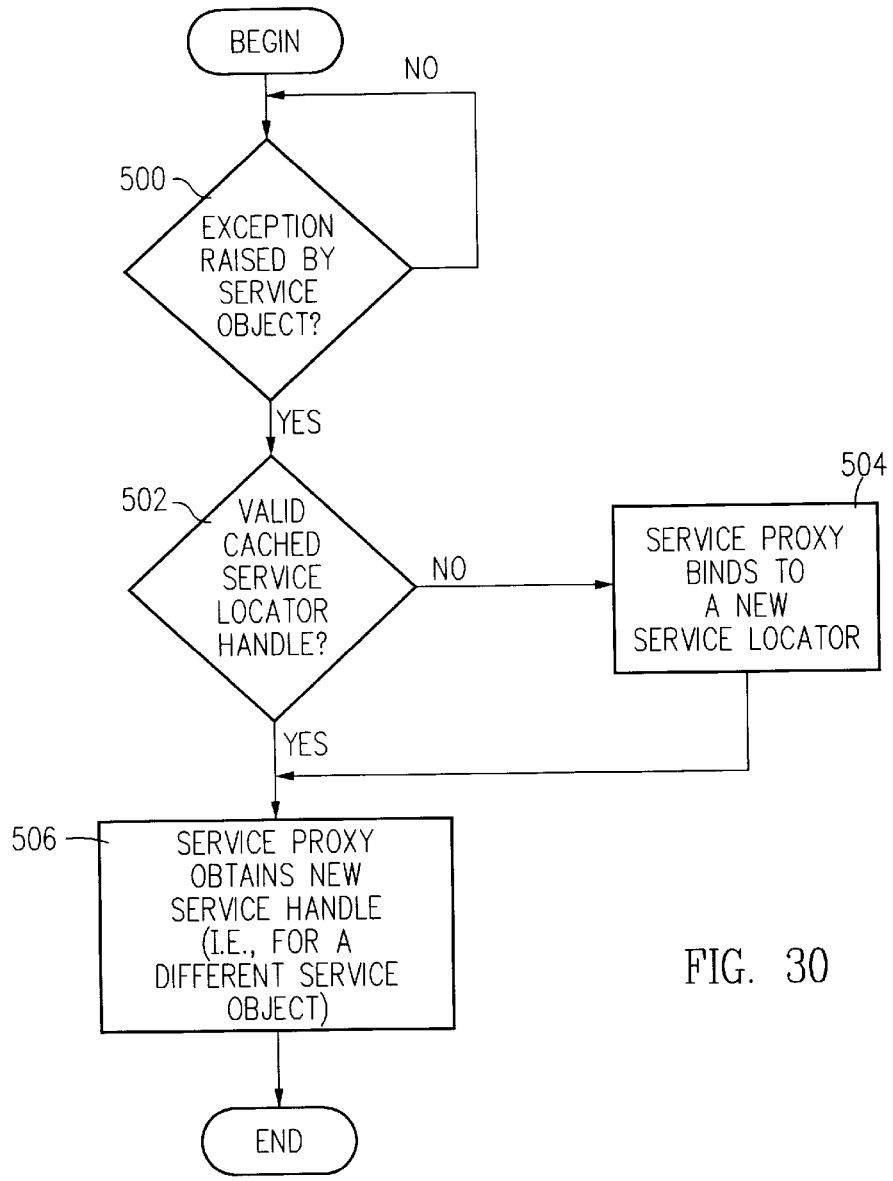
FIG. 30 is a flow diagram illustrating the fault tolerance operation for when a service object becomes unavailable in accordance with some embodiments of the present invention.

Also, in some embodiments, the service framework of the present invention also provides rebinding and fault tolerance as illustrated by the flow diagram of FIG. 30. In particular, in addition to encapsulating the complex logic for reserving a worker, the service proxy also encapsulates rebinding to a new service and worker upon failure thereby providing the service framework with an additional level of fault tolerance.

Accordingly, FIG. 30 is a flow diagram illustrating the fault tolerance operation for when a service object becomes unavailable. In stage 500, the service proxy determines whether an exception has been raised by the service object (e.g., whether or not the service object has failed during the reservation process). In stage 502, the service proxy also determines whether or not its currently cached service locator handle is valid. If not, the service proxy rebinds to another service locator, if available, in stage 504, and then proceeds to stage 506. In stage 506, the service proxy handles the exception raised by the service object and obtains a new service handle for a different service object from the service locator. Further, the service proxy may include some transient properties that control the rebinding processes. In some embodiments, the transient properties include a value for maximum rebind attempts and a value for delay in milliseconds before attempting to rebind to a service.

Figure 31:
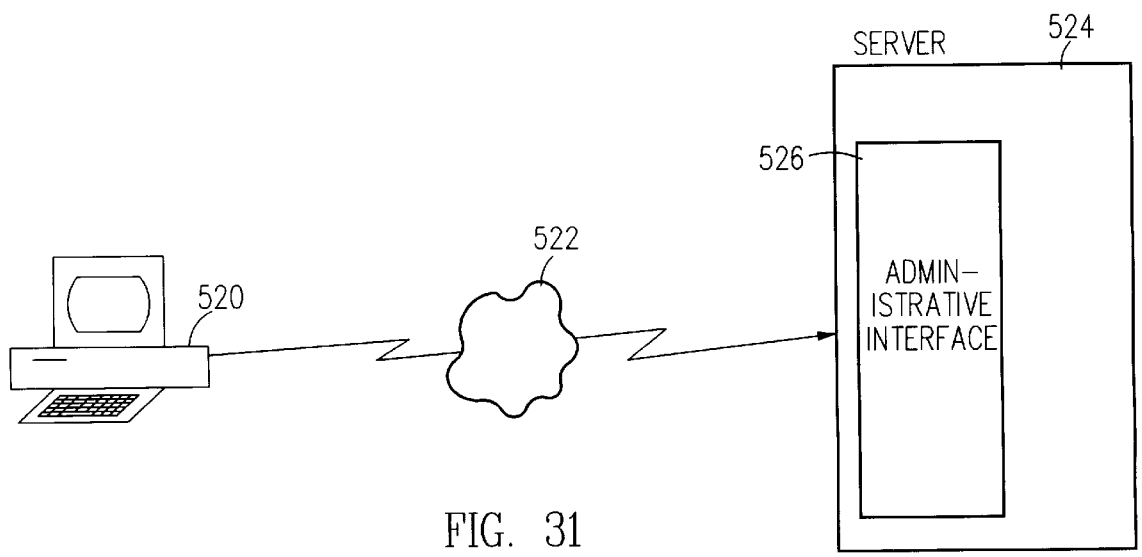
FIG. 31 shows an administrative interface in a server in accordance with some embodiments of the present invention.

FIG. 31 shows an administrative interface 526 in a server 524 in accordance with some embodiments of the present invention. A console 520 is linked by a network or local connection 522 to the server 524 that includes the administrative interface 526. The console 520 allows an operator to configure the configuration. As discussed above, the configuration defines a collection of services and service locators along with the properties of the services and the service locators. The configuration is maintained by the SM. An operator defines the configuration from the console 520. Thus, when the SM comes up, it comes up with a predetermined configuration of the services, service locators, and their properties. Once configured, the configured distributed object network system that includes the service framework of the present invention is fault tolerant. Thus, an operator is not required to monitor the console once a configuration has been configured and the system started. In some embodiments, the console 520 provides a central management console for remotely administering distributed applications (e.g., a console that includes management software written in JAVA for performing remote management of clients on the global Internet such as a standard browser client).

FIG. 32 provides an interface of the administrative interface in accordance with some embodiments of the present invention. In particular, the administrative interface of FIG. 32 is written in IDL. The implementation of the service framework derives from the administrative (admin) layer. In some embodiments, the admin layer can activate/deactivate an object, and the admin layer can also customize the object's behavior through the properties of the object. Accordingly, the service object's interface derives from the admin interface, and the service object's implementation extends the admin layer. For example, the SM uses the service object's admin layer to start and stop the services and set the properties of the services.

Although particular embodiments of the present invention have been shown and described, it will be obvious to those skilled in the art that changes and modifications can be made without departing from the present invention in its broader aspects and, therefore, the appended claims are to encompass within their scope all such changes and modifications that fall within the true spirit and scope of this invention.

What is claimed is:

1. A distributed object network system comprising:
   a first computer;
   a second computer;
   a network connecting the second computer to the first computer;
   a service residing on the first computer, the service providing access to a limited resource that resides on the first computer; and
   a service framework comprising:
      a first set of computer instructions executed by the first computer, the first set of computer instructions providing access to the service by allocating a worker in a worker pool for the service in response to a service request, wherein the worker executes the service request, and the first set of computer instructions provides workload balancing among a plurality of workers in the worker pool for the service;
      a second set of computer instructions executed by the second computer, the second set of computer instructions requesting said service from the first computer; and
      a service locator executed by the first computer, the service locator providing an object reference to the first set of computer instructions in response to a get service operation from the second set of computer instructions, wherein the service locator provides workload balancing among instances of the service.

2. The system of claim 1 wherein the service framework further comprises:
   a third set of computer instructions executed by the second computer, the third set of computer instructions providing an object reference to an instance of the service locator in response to a find service operation from the second set of computer instructions, wherein the third set of computer instructions provides workload balancing among instances of the service locator.

3. A distributed object network system comprising:
   a first computer;
   a second computer;
   a network connecting the second computer to the first computer;
   a service residing on the first computer, the service providing access to a limited resource thelt resides on the first computer; and
   a service framework comprising:
      a first set of computer instructions executed by the first computer, the first set of computer instructions providing access to the service by allocating a worker in a worker pool for the service in response to a service request, wherein the worker executes the service request, and the first set of computer instructions provides workload balancing among a plurality of workers in the worker pool for the service;
      a second set of computer instructions executed by the second computer, the second set of computer instructions requesting said service from the first computer; and
      a third set of computer instructions executed by the first computer, the third set of computer instructions instantiating the second set of computer instructions and registering the service with a service locator, wherein the service locator is executed by the first computer and provides an object reference to the first set of computer instructions in response to a get service operation from the second set of computer instructions.

4. A distributed object network system comprising:
a first computer;
a second computer;
a network connecting the second computer to the first computer;
a service residing on the first computer, the service providing access to a limited resource that resides on the first computer; and
a service framework comprising:
   a first set of computer instructions executed by the first computer, the first set of computer instructions providing access to the service by allocating a worker in a worker pool for the service in response to a service request, wherein the worker executes the service request, and the first set of computer instructions provides workload balancing among a plurality of workers in the worker pool for the service; and
   a second set of computer instructions executed by the second computer, the second set of computer instructions requesting said service from the first computer, wherein the second set of computer instructions further comprises:
      obtaining an object reference to a service locator;
      obtaining the object reference to the requested service;
      obtaining a reservation on the worker in the worker pool for the requested service; and
      executing the service request on the worker in the worker pool for the requested service.

5. The system of claim 4 wherein the first set of computer instructions further comprises:
allocating reservations among at least two workers in the worker pool for the service.

6. The system of claim 5 wherein the first set of computer instructions further comprises:
balancing the workload among the workers in the worker pool by providing at least two quetles that each comprise workers that have various properties, wherein each queue comprises a sub-queue that comprises workers that have various priorities.

7. The system of claim 6 wherein the second set of computer instructions further comprises:
providing a reservation context that comprises a client key, a worker key, and service key.

8. The system of claim 7 wherein the service framework is implemented as CORBA extensions.

9. The system of claim 8 wherein the second computer further comprises:
a web browser.

10. The system of claim 9 wherein the service framework provides session management for a connection between the first set of computer instructions and the second set of computer instructions during a worker reservation.

11. The system of claim 10 wherein the second computer further comprises:
a JAVA applet executed by the second computer, wherein the second set of computer instructions provides the service request in Internet Inter-ORB Protocol (IIOP) to the first set of computer instructions.

12. A computer implemented method for providing a service framework in a distributed object network system, the method comprising:
executing a first set of computer instructions in a first computer, the first set of computer instructions providing access to a service by allocating a worker in a worker pool for the service in response to a service request, wherein the first set of computer instructions provides workload balancing among a plurality of workers in the worker pool for the service, and the service provides access to a limited resource that resides on the first computer; and
executing a second set of computer instructions in a second computer, the second set of computer instructions encapsulating the operation of performing a service request for the second computer, wherein the second computer connects to the first computer over a network and further wherein said executing the second set of computer instructions further comprises:
   finding the requested service using a service locator, wherein the service locator provides an object reference to the first set of computer instructions;
   obtaining an allocated worker in the worker pool for the requested service, wherein the allocated worker is selected and reserved by the first set of computer instructions, and the allocated worker executes service requests;
   receiving results of the service request from the allocated worker; and
   passing the results of the service request to the second computer.

13. A computer implemented method for providing a service framework in a distributed object network system, the method comprising:
executing a first set of computer instructions in a first computer, the first set of computer instructions providing access to a service by allocating a worker in a worker pool for the service in response to a service request, wherein the first set of computer instructions provides workload balancing among a plurality of workers in the worker pool for the service, and the service provides access to a limited resource that resides on the first computer;
executing a second set of computer instructions in a second computer, the second set of computer instructions encapsulating the operation of performing a service request for the second computer, wherein the second computer connects to the first computer over a network; and
executing a third set of computer instructions in the second computer, the third set of computer instructions providing workload balancing among instances of a service locator, wherein the service locator provides an object reference to the first set of computer instructions.

14. A computer implemented method for providing a service framework in a distributed object network system, the method comprising:
executing a first set of computer instructions in a first computer, the first set of computer instructions providing access to a service by allocating a worker in a worker pool for the service in response to a service request, wherein the first set of computer instructions provides workload balancing among a plurality of workers in the worker pool for the service, and the service provides access to a limited resource that resides on the first computer;
executing a second set of computer instructions in a second computer, the second set of computer instructions encapsulating the operation of performing a service request for the second computer, wherein the second computer connects to the first computer over a network and further wherein said executing the first set of computer instructions further comprises:

allocating reservations among at least two workers in the worker pool for the service based on worker statistics; and providing a load balancing manager that comprises at least two queues that each comprise workers that have various properties, wherein each queue comprises a sub-queue that comprises workers that have various priorities.

15. A computer-readable medium comprising software for a service framework for a distributed object network system, the service framework software comprising:

a set of objects, the set of objects providing access to a service, the service providing access to a limited resource residing on a first computer, wherein the set of objects further comprises:

a plurality of workers in a worker pool for the service;

a load balancing manager that balances workloads among the plurality of workers in the worker pool for the service; and a service proxy object, the service proxy object encapsulating, for a second computer, the operation of a service request to the set of objects, wherein the second computer connects to the first computer over a network.

16. A computer-readable medium comprising software for a service framework for a distributed object network system, the service framework software comprising:

a set of objects, the set of objects providing access to a service, the service providing access to a limited resource residing on a first computer, wherein the set of objects further comprises:

a plurality of workers in a worker pool for the service;

a load balancing manager that balances workloads among the plurality of workers in the worker pool for the service; and a service proxy locator object, the service proxy locator object providing workload balancing among instances of a service locator, wherein the service locator provides an object reference to the set of objects and balances workloads among instances of the requested service.

* * * * *

UNITED STATES PATENT AND TRADEMARK OFFICE
CERTIFICATE OF CORRECTION

PATENT NO.    : 6,209,018 B1
DATED         : March 27, 2001
INVENTOR(S)   : Ofer Ben-Shachar, Vijay Anand, Ken Ebbs, Yarden Y. Malka and David L. Brewster It is certified that error appears in the above-identified patent and that said Letters Patent is hereby corrected as shown below:

<u>Column 32,</u>
Line 43, delete "thelt" and substitute -- that --.

<u>Column 33,</u>
Line 38, delete "quetles" and substitute -- queues --.

Signed and Sealed this

Twenty-third Day of April, 2002

Attest:

*Attesting Officer*

JAMES E. ROGAN
*Director of the United States Patent and Trademark Office*